(12) United States Patent
Patel

(10) Patent No.: US 7,788,051 B2
(45) Date of Patent: Aug. 31, 2010

(54) METHOD AND APPARATUS FOR PARALLEL LOADFLOW COMPUTATION FOR ELECTRICAL POWER SYSTEM

(76) Inventor: Sureshchandra B. Patel, 37 Miller Street, Toronto, Ontario (CA) M6N 2Z6

( * ) Notice: Subject to any disclaimer, the term of this patent is extended or adjusted under 35 U.S.C. 154(b) by 0 days.

(21) Appl. No.: 10/594,715

(22) PCT Filed: Sep. 30, 2005

(86) PCT No.: PCT/CA2005/001537

§ 371 (c)(1),
(2), (4) Date: Sep. 29, 2006

(87) PCT Pub. No.: WO2006/037231

PCT Pub. Date: Apr. 13, 2006

(65) Prior Publication Data

US 2007/0203658 A1 Aug. 30, 2007

(30) Foreign Application Priority Data

Oct. 1, 2004 (CA) .................................. 2479603

(51) Int. Cl.
*G01R 21/00* (2006.01)
*G01R 21/06* (2006.01)
(52) U.S. Cl. ..................................................... 702/60
(58) Field of Classification Search ............... 702/1–12, 702/60, 61, 64, 57–59, 65, 85, 183, 185, 702/189, 198; 361/64, 86, 87, 90, 91.1; 700/286, 700/291, 295, 297; 703/3, 4, 13, 18; 323/205
See application file for complete search history.

(56) References Cited

U.S. PATENT DOCUMENTS 3,886,330 A * 5/1975 Egelston et al. ................ 703/3

(Continued)

FOREIGN PATENT DOCUMENTS

CA 2107388 * 5/1995

(Continued)

OTHER PUBLICATIONS

Patel, S.B., "Fast super decoupled loadflow," IEEE Proceedings on Generation, Transmission, and Distribution, vol. 139, Issue 1, Jan. 1992, pp. 13-20.*

(Continued)

*Primary Examiner*—Michael P Nghiem

(57) ABSTRACT

Gauss-Seidel-Patel Loadflow (GSPL) loadflow calculation method is invented involving self-iteration over a node within global iteration over (n−1) nodes in n-node power network. Also invented is a network decomposition technique referred to as Suresh's diakoptics that determines a sub-network for each node involving directly connected nodes referred to as level-1 nodes and their directly connected nodes referred to as level-2 nodes, wherein the level of outward connectivity for local solution of a sub-network around a given node is to be determined experimentally. Sub-networks are solved in parallel, and local solution of sub networks are related into network wide global solution using an invented technique. These led to the invention of the best possible parallel computer—a server-processor parallel-processors architecture wherein each of the parallel processors communicate only with the server processor, commonly shared memory locations, and each processor's private memory locations but not among themselves.

4 Claims, 14 Drawing Sheets

U.S. PATENT DOCUMENTS

| | | | |
|---|---|---|---|
| 4,868,410 A * | 9/1989 | Nakamura | 307/20 |
| 5,081,591 A * | 1/1992 | Hanway et al. | 323/205 |
| 5,798,939 A * | 8/1998 | Ochoa et al. | 700/286 |
| 6,182,196 B1 * | 1/2001 | DeRoo | 711/144 |
| 6,243,244 B1 * | 6/2001 | Nelson et al. | 361/64 |
| 6,347,027 B1 * | 2/2002 | Nelson et al. | 361/64 |
| 2003/0192039 A1 * | 10/2003 | McConnell | 717/171 |
| 2006/0111860 A1 * | 5/2006 | Trias | 702/85 |
| 2008/0281474 A1 * | 11/2008 | Patel | 700/298 |

FOREIGN PATENT DOCUMENTS

| | | | |
|---|---|---|---|
| WO | WO 2004/023622 | * | 3/2004 |
| WO | 2008025162 | * | 3/2008 |

OTHER PUBLICATIONS

Patel S.B., "Transformation Based Fast Decoupled Loadflow," IEEE Region 10 International Conference on EC3-Energy, Computer, Communication and Control Systems, vol. 1, Aug. 28-30, 1991, pp. 183-187.*

Van Amerongen, R.A.M., "A general-purpose version of the fast decoupled load flow," IEEE Transactions on Power Systems, vol. 4, Issue 2, May 1989, pp. 760-770.*

Allan, R.N. et al. "LTC Transformers and MVAR Violations in the Fast Decoupled Load Flow," IEEE Transactions on Power Apparatus and Systems, vol. PAS-101, Issue 9, Sep. 1982, pp. 3328-3332.*

Patel S.B., "Super Super Decoupled Loadflow", proceedings of the IEEE Toronto International Conference on Science and Technology for Humanity (TIC-STH 2009), Sep. 2009, pp. 652-659.*

* cited by examiner

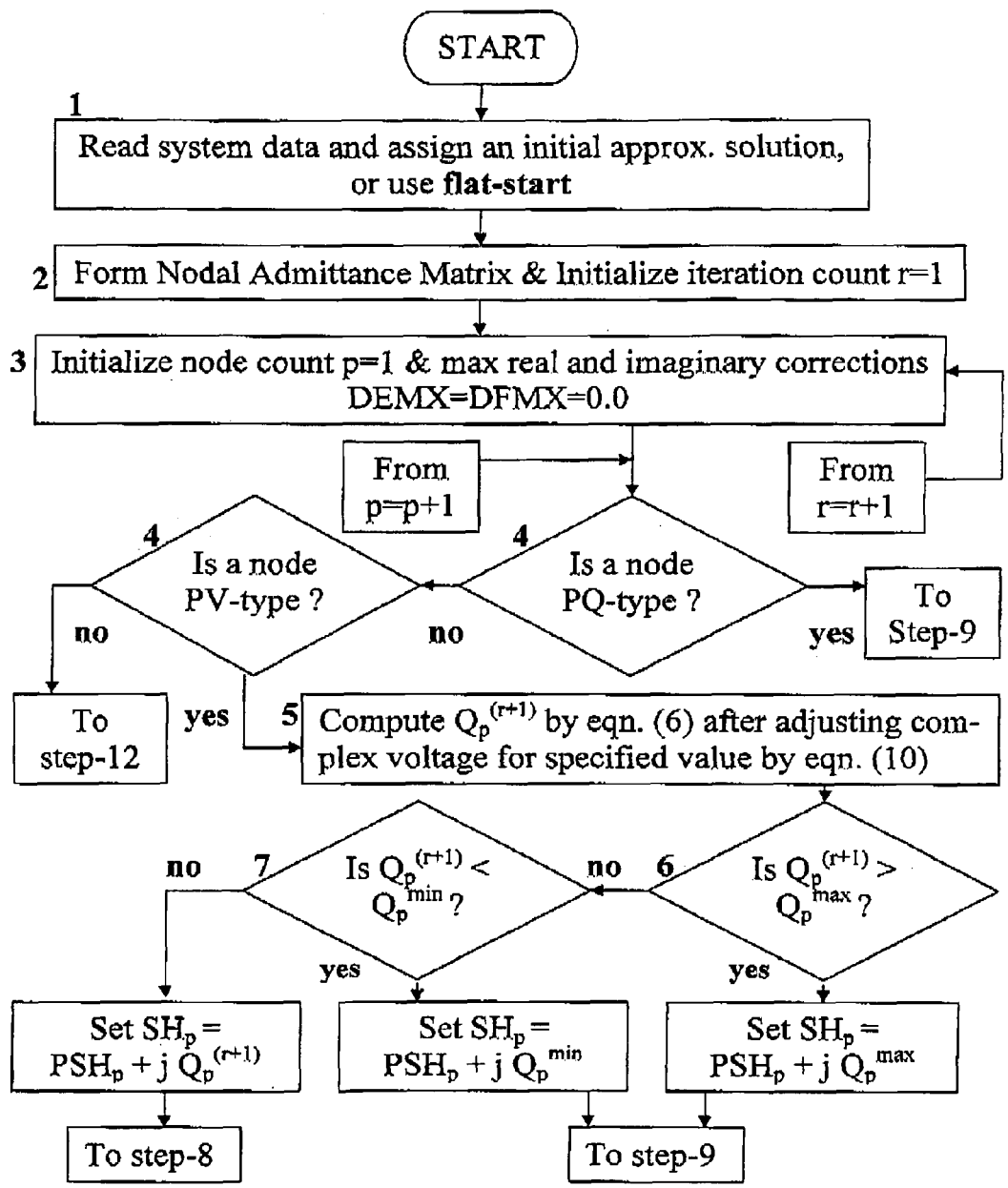
Fig.1a: Prior Art: Flow-chart of Gauss-Seidel Loadflow (GSL) Method

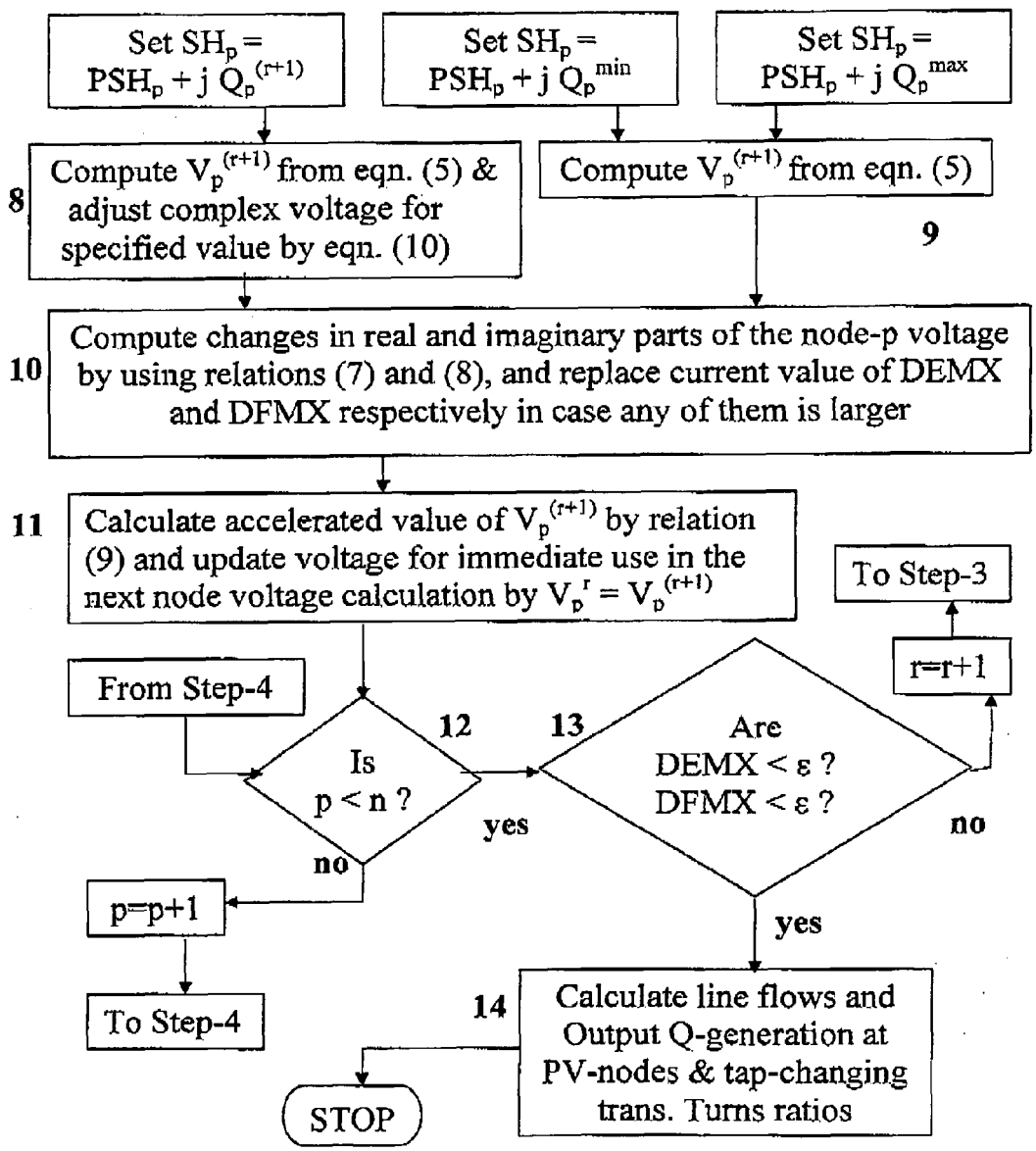
Fig.1a: Prior Art: Flow-chart of Gauss-Seidel Loadflow (Cont.) (GSL) Method

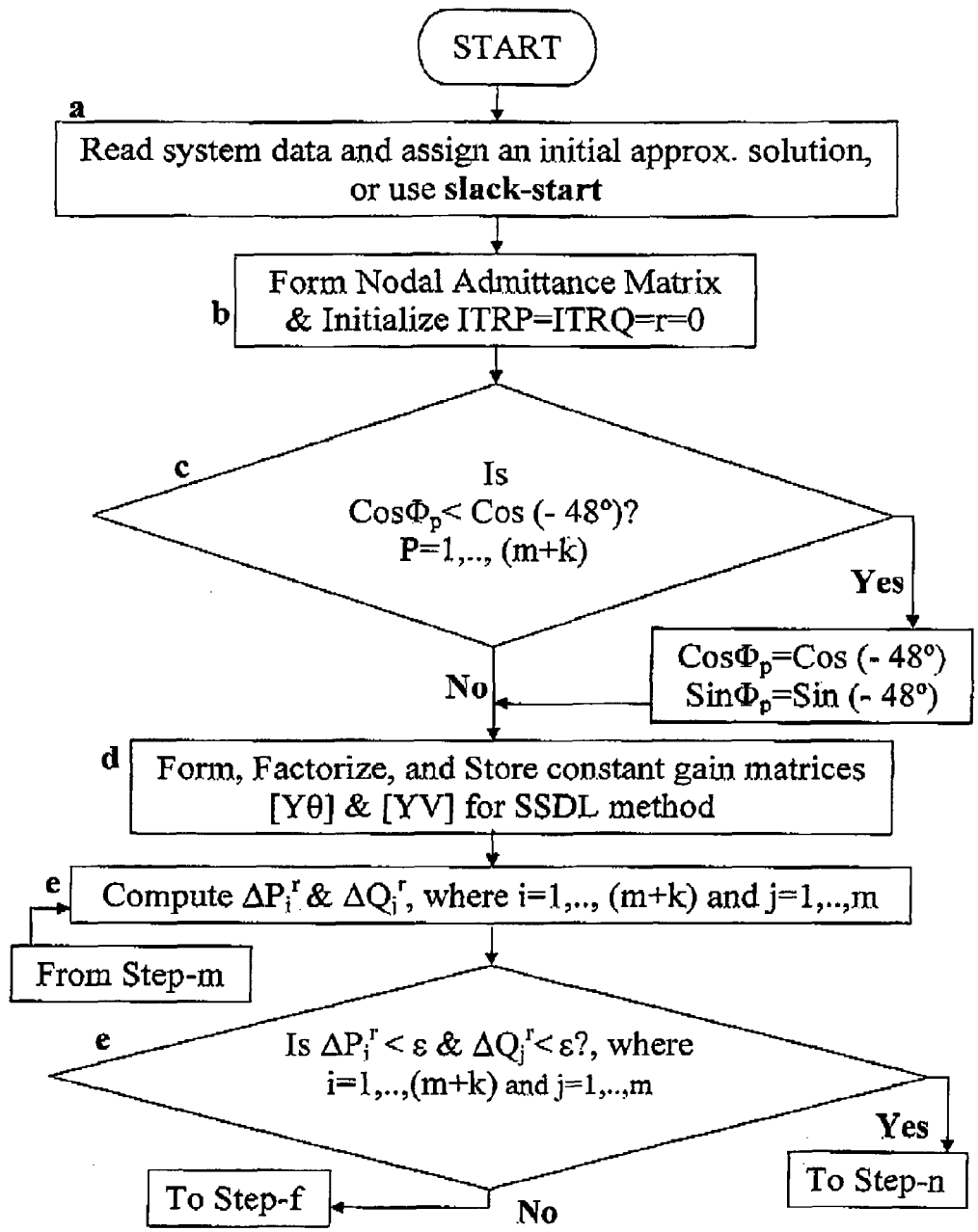
Fig.1b: Prior Art: Flow-chart of Super Super Decoupled Loadflow (SSDL) method

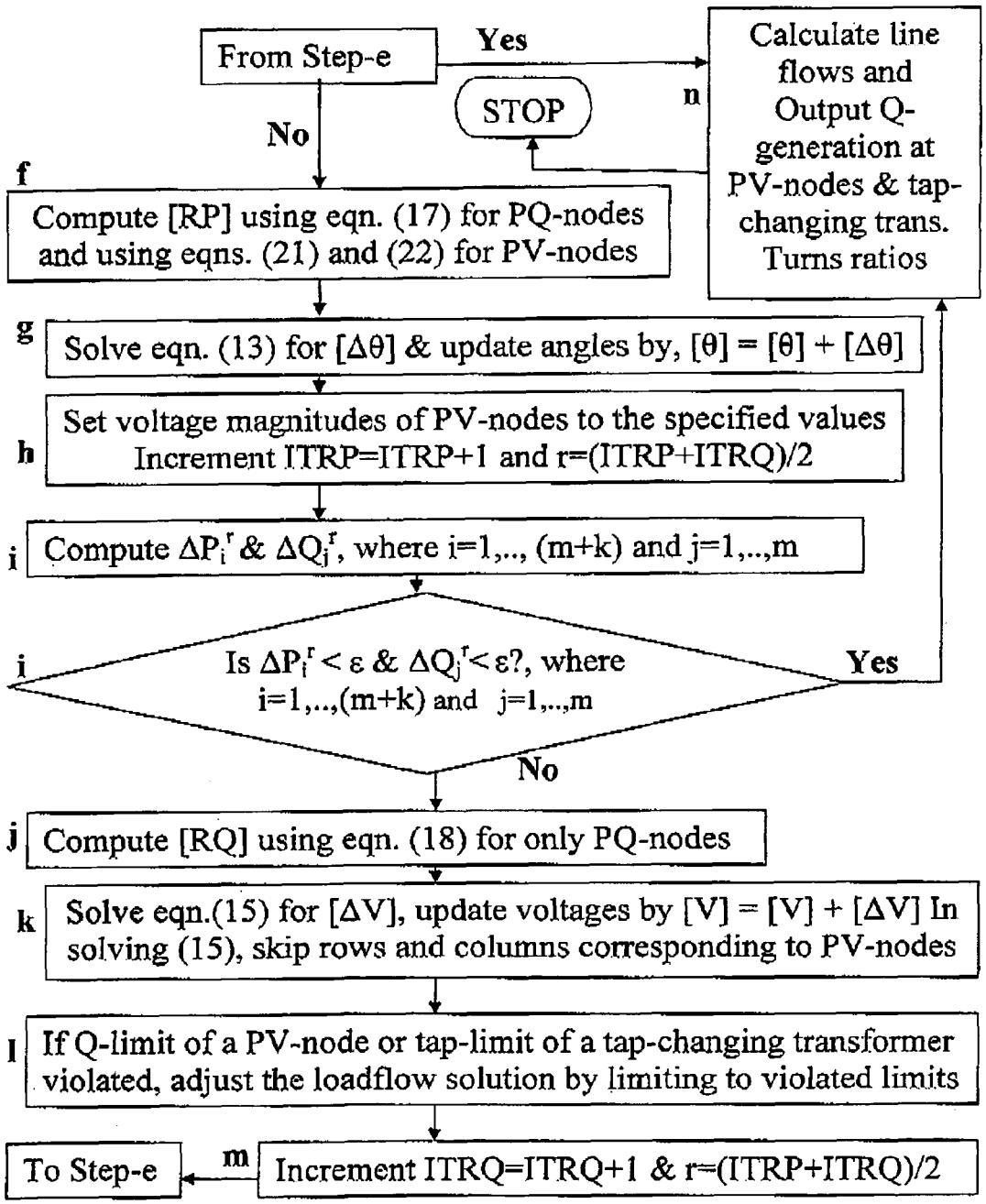
Fig.1b: Prior Art: Flow-chart of Super Super Decoupled
(Cont.) Loadflow (SSDL) method

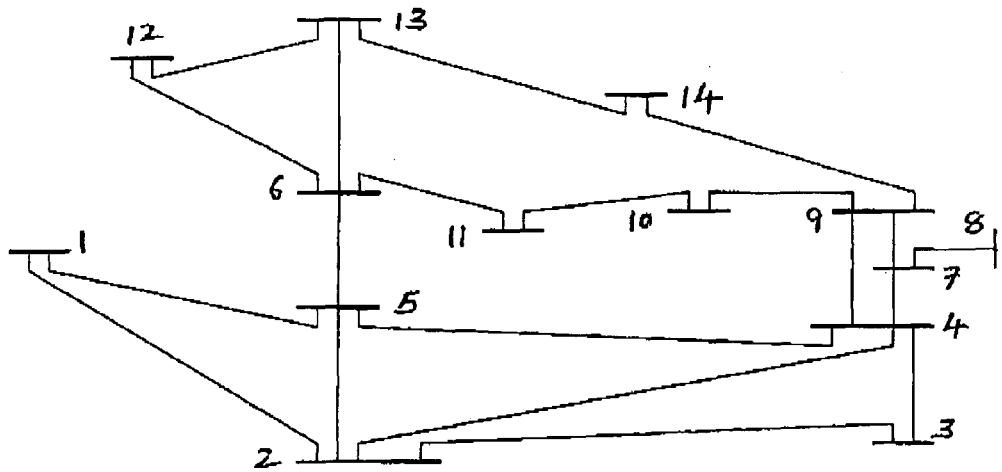
Fig. 2a: One-line diagram of IEEE 14-node network
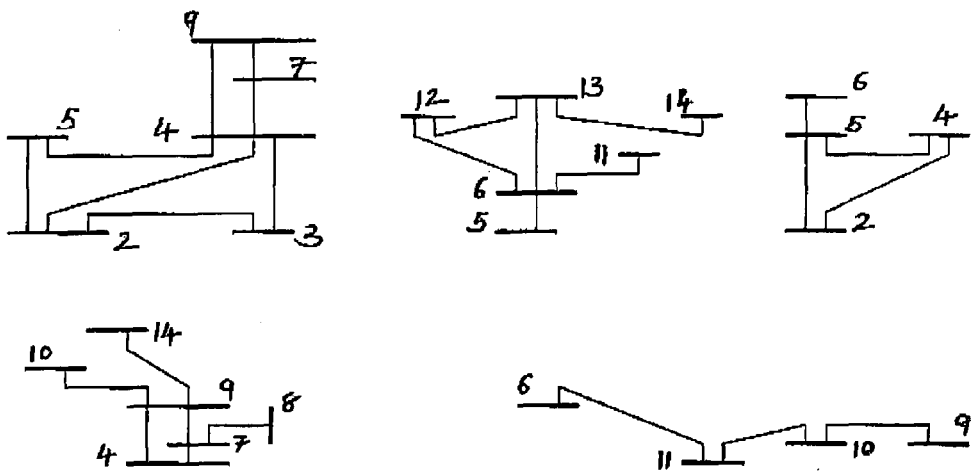
Fig. 2c: Non-redundant Level-1 sub-networks of fig. 2b are regrouped to reduce the number of processors required without increasing the number of nodes in any regrouped sub-network larger than the original largest sub-network of 6-nodes

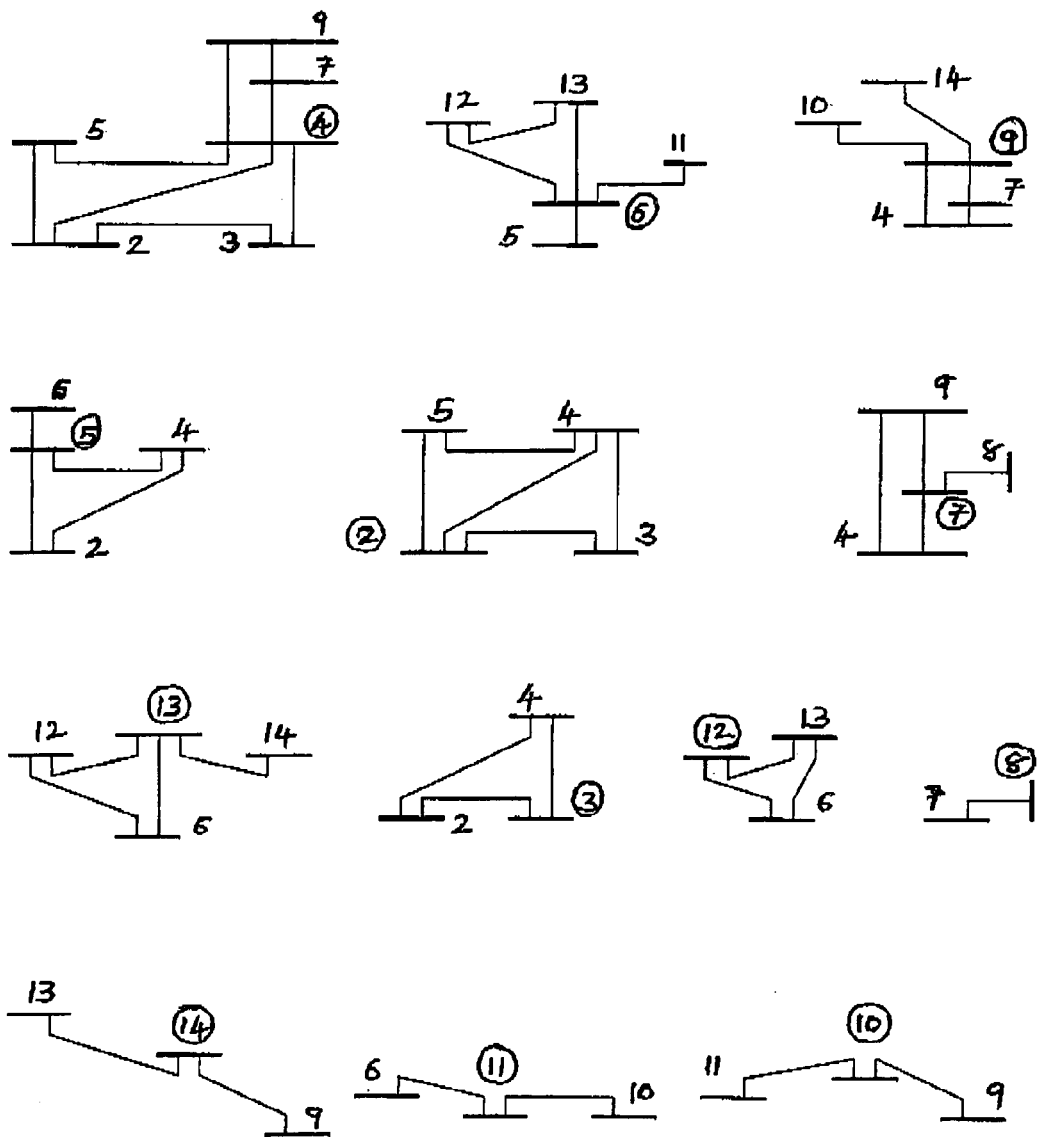
Fig. 2b: Level-1 sub-networks around circled nodes for the network of fig. 2a

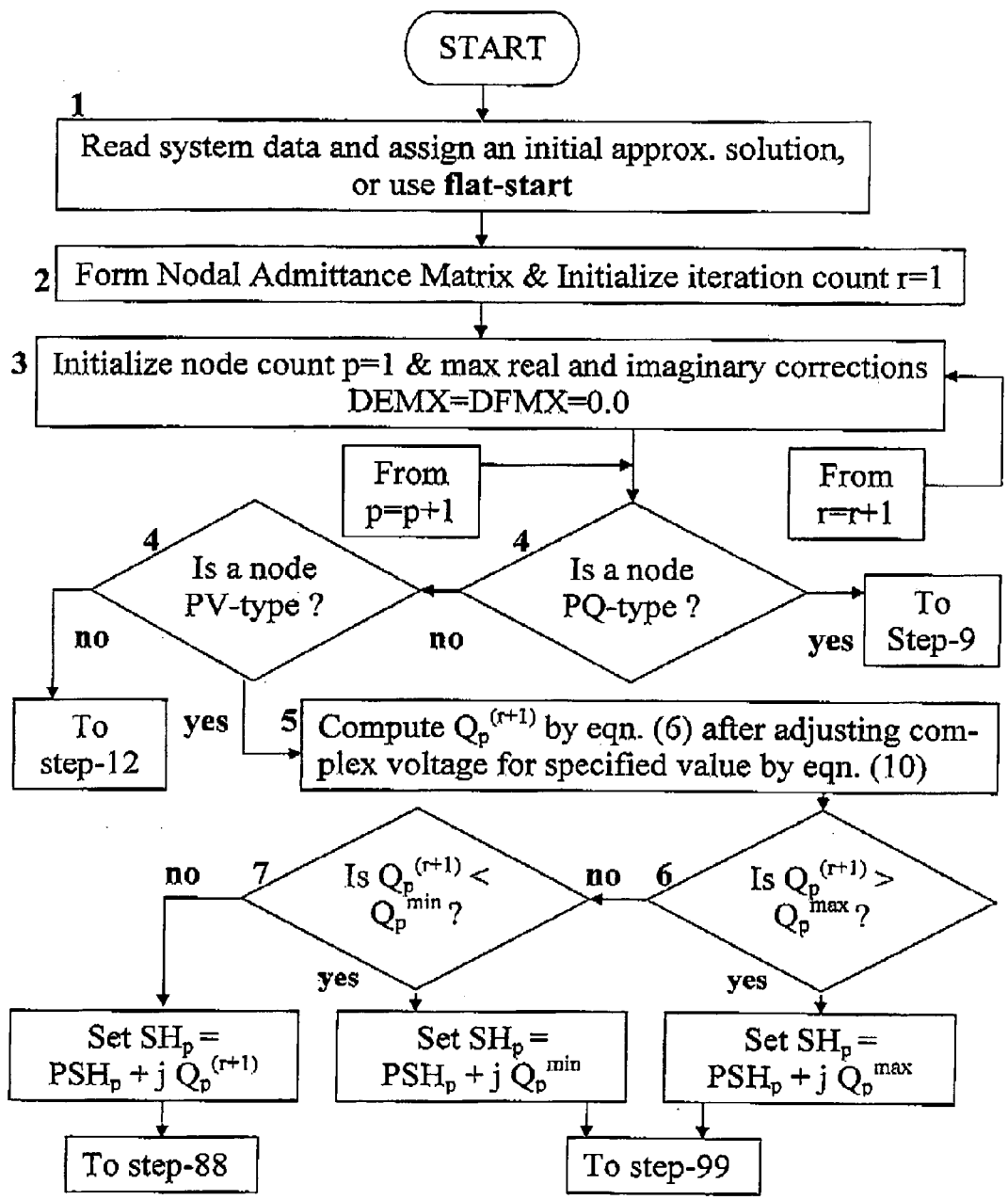
Fig.3a: Invention: Flow-chart of Gauss-Seidel-patel Loadflow (GSPL) Method

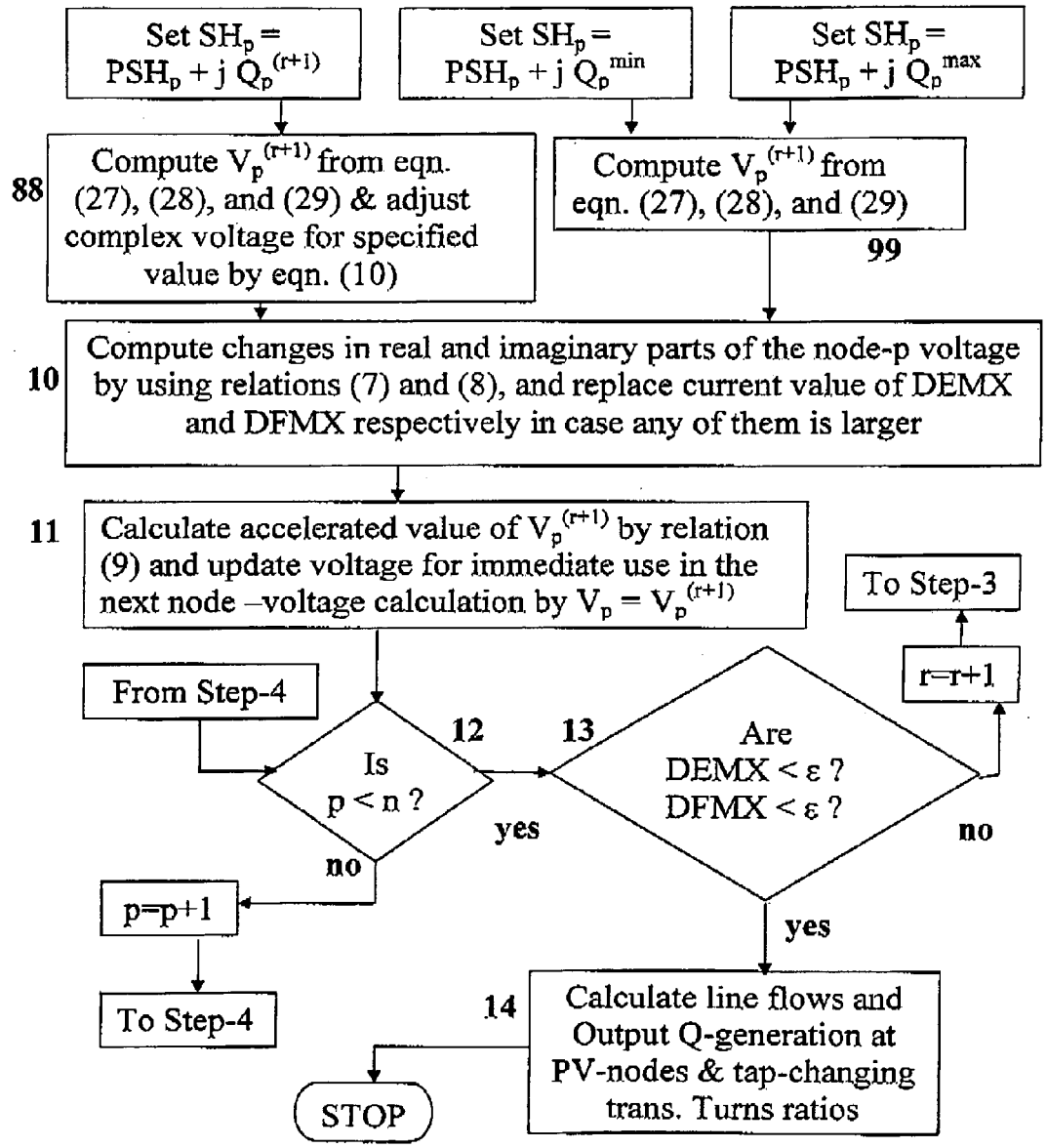
Fig.3a: Invention: Flow-chart of Gauss-Seidel-patel Loadflow (GSPL) Method
(Cont.)

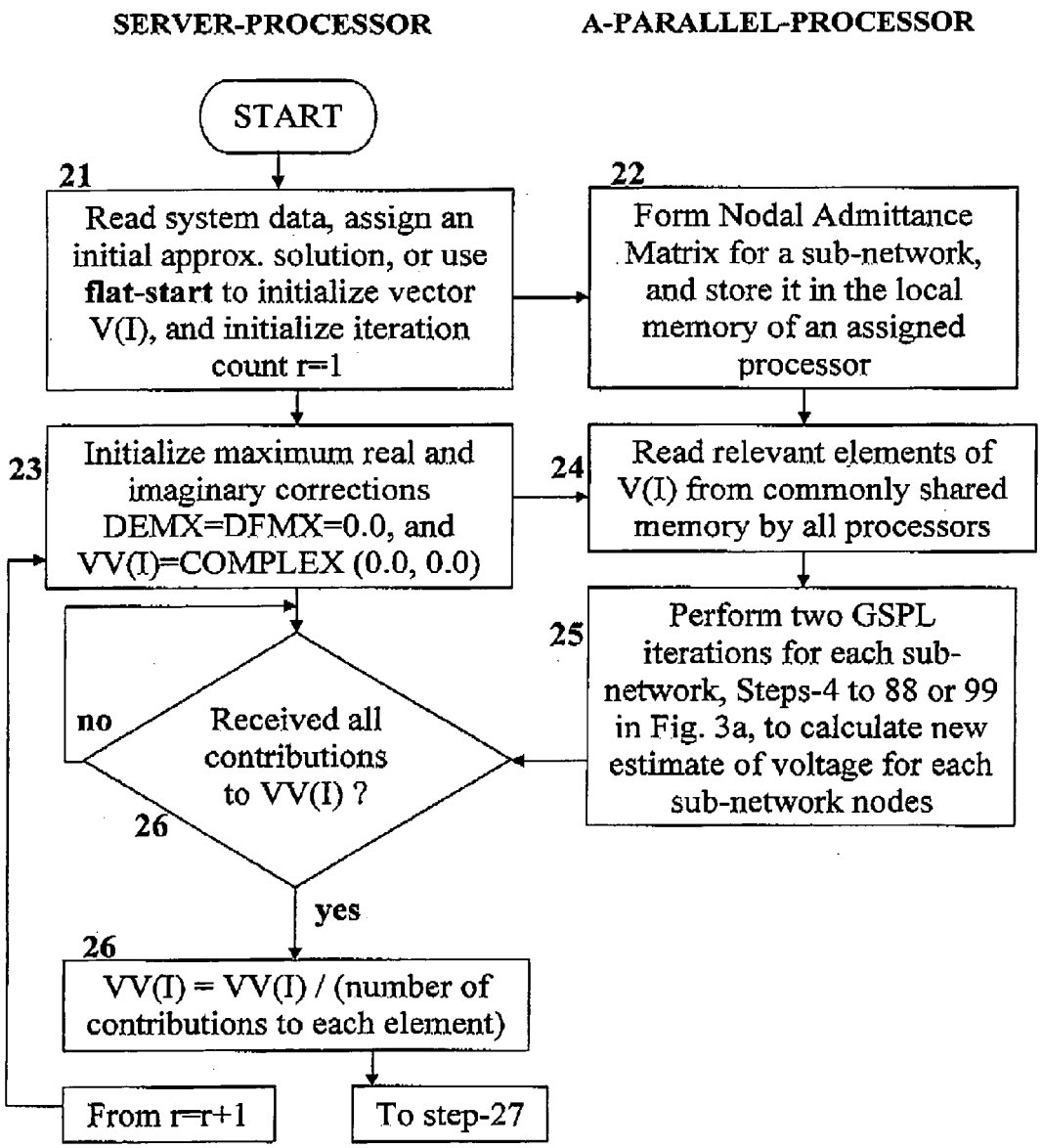
Fig.3b: Invention: Flow-chart of Parallel-Gauss-Seidel-Patel Loadflow (PGSPL) Method

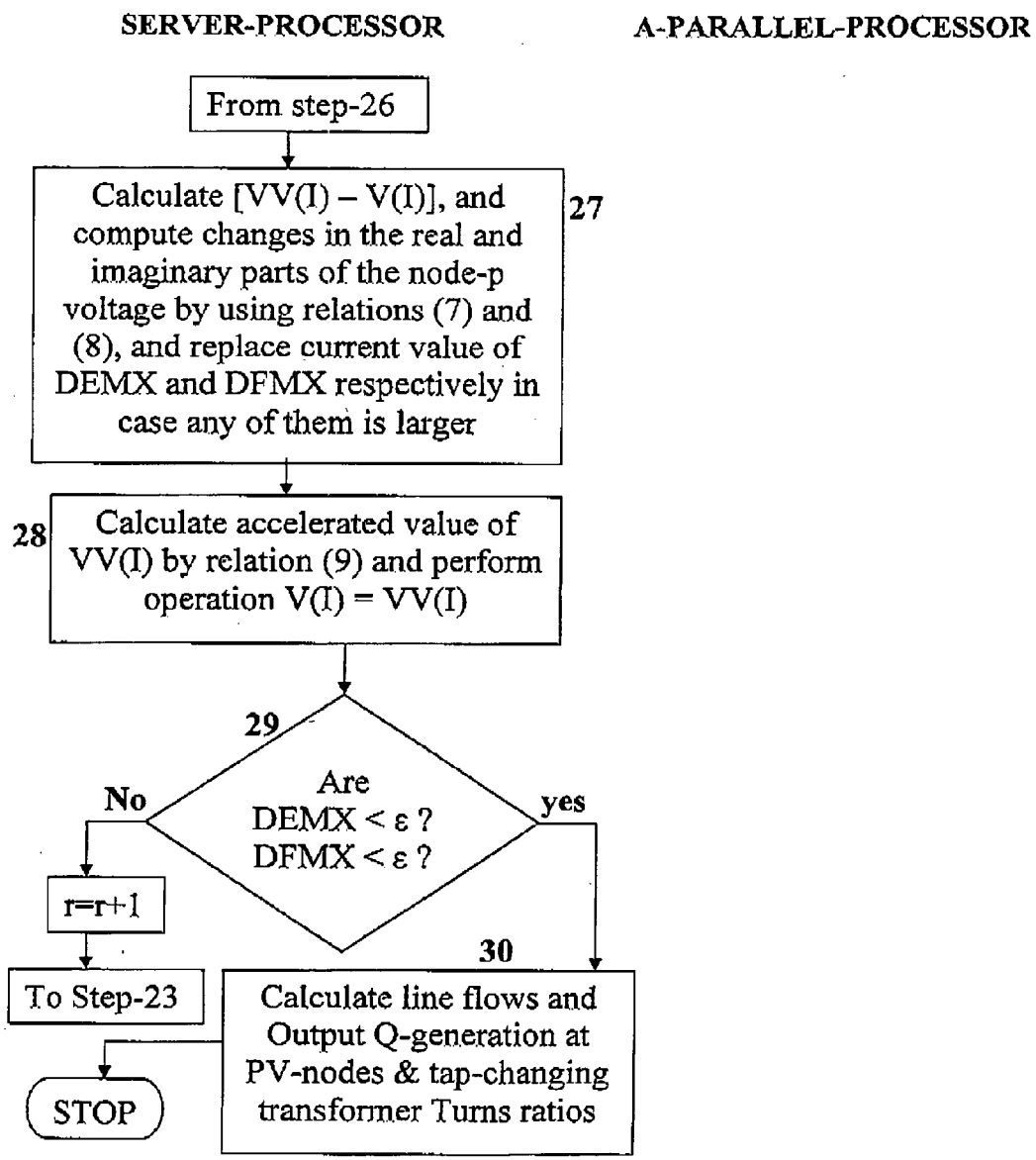
Fig.3b: Invention: Flow-chart of Parallel-Gauss-Seidel-
(Cont.)   Patel Loadflow (PGSPL) Method

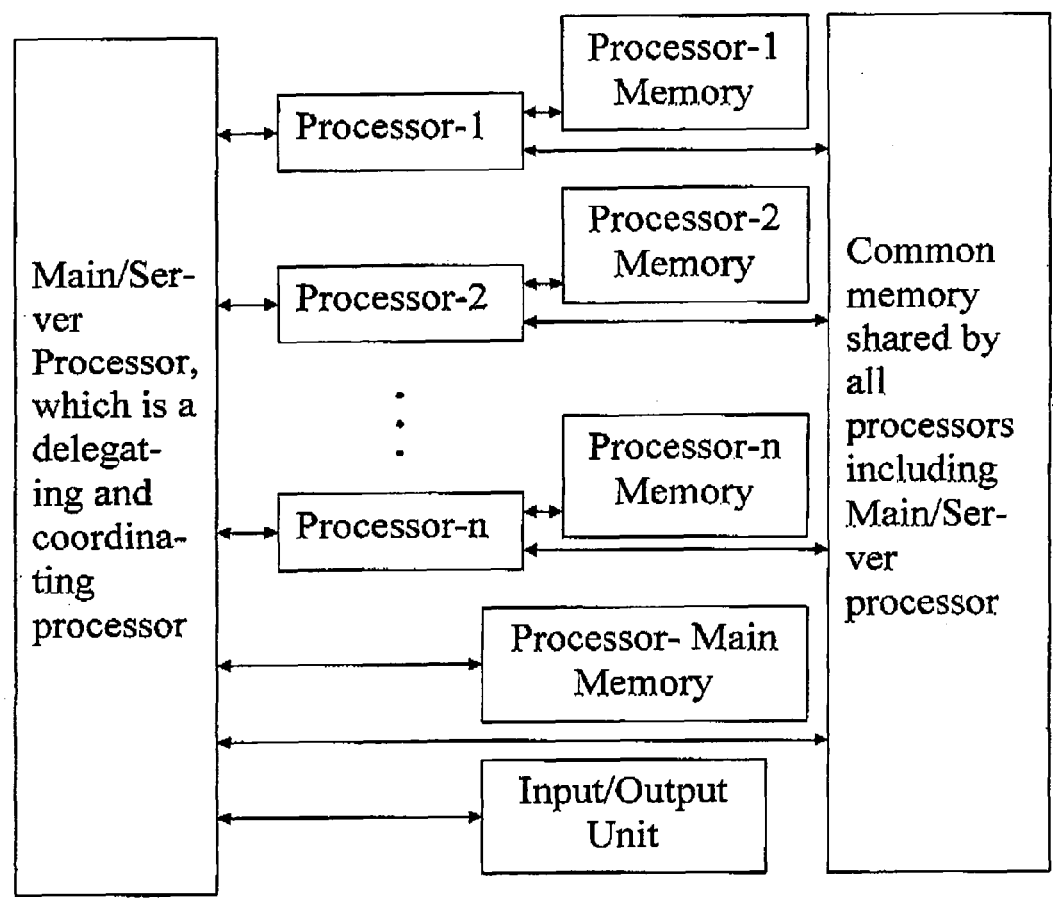
Fig. 4: Invented Parallel computer Architecture /organization

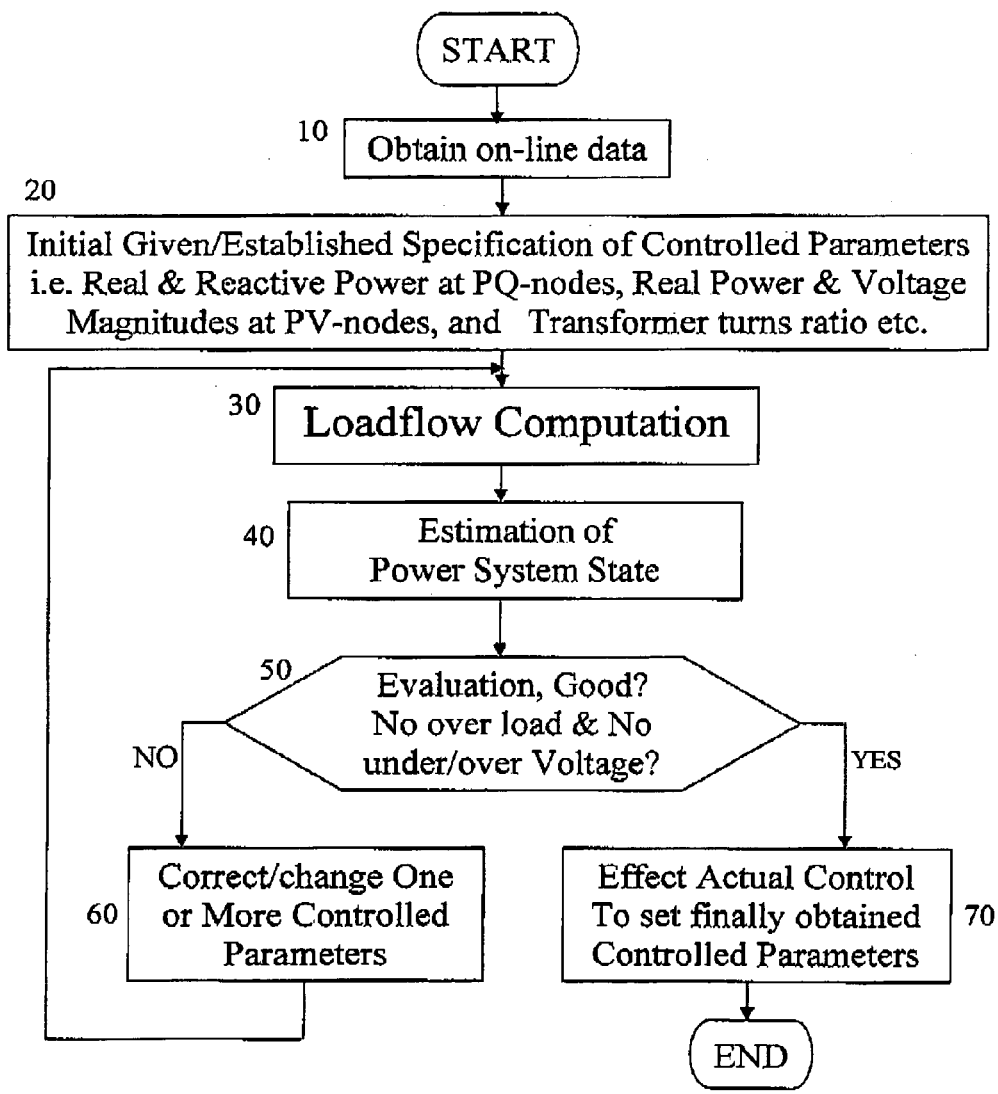
Fig.5: Prior Art: Loadflow Computation in Power Flow Control and/or Voltage Control in Electrical Power System

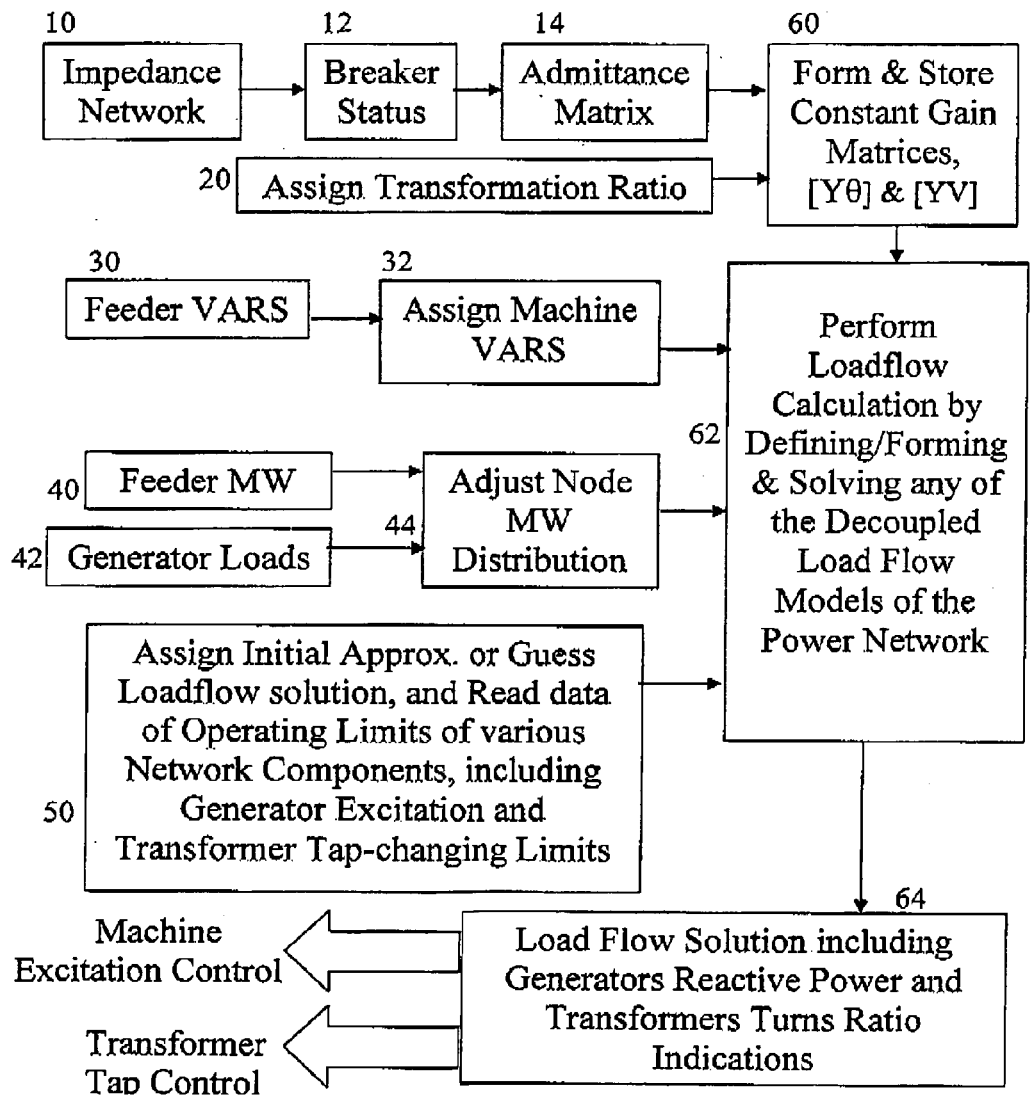
Fig. 6: Prior Art: Load-Flow Computation for Voltage Control in Electrical Power System

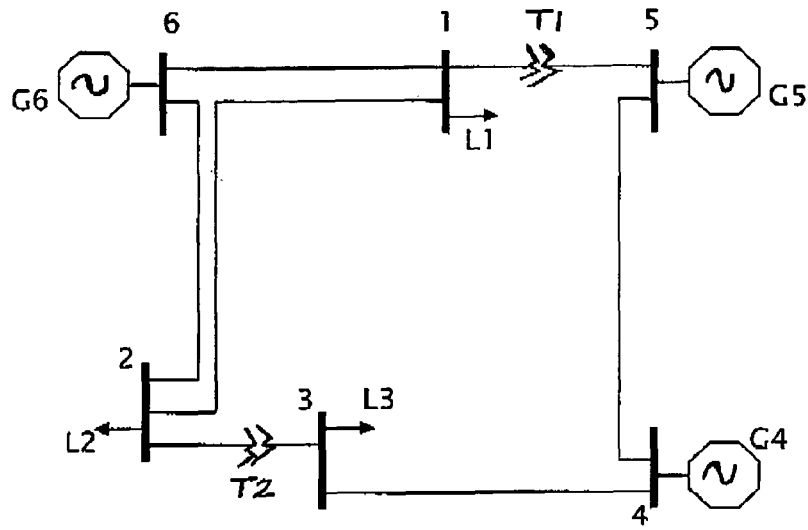

Fig. 7: Prior Art: An Exemplary 6-node Power System
  Nodes: 1, 2, 3 are PQ-nodes; arrows extending
    outwards L1, L2, L3 are connected loads
    including Electrical Motor loads
  Nodes: 4 and 5 are PV-nodes, where equivalent plant
    generators G4 and G5 are connected
  Nodes: 6 is the reference/slack/swing node, where
    equivalent biggest plant generator G6 is
    connected
  T1 and T2 are tap-changing Transformers control-
    ling voltages of noses 1 and 2 respectively

METHOD AND APPARATUS FOR PARALLEL LOADFLOW COMPUTATION FOR ELECTRICAL POWER SYSTEM

TECHNICAL FIELD

The present invention relates to methods of loadflow computation in power flow control and voltage control in an electrical power system. It also relates to the parallel computer architecture and distributed computing architecture.

BACKGROUND OF THE INVENTION

The present invention relates to power-flow/voltage control in utility/industrial power networks of the types including many power plants/generators interconnected through transmission/distribution lines to other loads and motors. Each of these components of the power network is protected against unhealthy or alternatively faulty, over/under voltage, and/or over loaded damaging operating conditions. Such a protection is automatic and operates without the consent of power network operator, and takes an unhealthy component out of service by disconnecting it from the network. The time domain of operation of the protection is of the order of milliseconds.

The purpose of a utility/industrial power network is to meet the electricity demands of its various consumers 24-hours a day, 7-days a week while maintaining the quality of electricity supply. The quality of electricity supply means the consumer demands be met at specified voltage and frequency levels without over loaded, under/over voltage operation of any of the power network components. The operation of a power network is different at different times due to changing consumer demands and development of any faulty/contingency situation. In other words healthy operating power network is constantly subjected to small and large disturbances. These disturbances could be consumer/operator initiated, or initiated by overload and under/over voltage alleviating functions collectively referred to as security control functions and various optimization functions such as economic operation and minimization of losses, or caused by a fault/contingency incident.

For example, a power network is operating healthy and meeting quality electricity needs of its consumers. A fault occurs on a line or a transformer or a generator which faulty component gets isolated from the rest of the healthy network by virtue of the automatic operation of its protection. Such a disturbance would cause a change in the pattern of power flows in the network, which can cause over loading of one or more of the other components and/or over/under voltage at one or more nodes in the rest of the network. This in turn can isolate one or more other components out of service by virtue of the operation of associated protection, which disturbance can trigger chain reaction disintegrating the power network.

Therefore, the most basic and integral part of all other functions including optimizations in power network operation and control is security control. Security control means controlling power flows so that no component of the network is over loaded and controlling voltages such that there is no over voltage or under voltage at any of the nodes in the network following a disturbance small or large. As is well known, controlling electric power flows include both controlling real power flows which is given in MWs, and controlling reactive power flows which is given in MVARs. Security control functions or alternatively overloads alleviation and over/under voltage alleviation functions can be realized through one or combination of more controls in the network. These involve control of power flow over tie line connecting other utility network, turbine steam/water/gas input control to control real power generated by each generator, load shedding function curtails load demands of consumers, excitation controls reactive power generated by individual generator which essentially controls generator terminal voltage, transformer taps control connected node voltage, switching in/out in capacitor/reactor banks controls reactive power at the connected node.

Control of an electrical power system involving power-flow control and voltage control commonly is performed according to a process shown in FIG. 4. The various steps entail the following.

Step-10: Obtain on-line/simulated readings of open/close status of all switches and circuit breakers, and read data of maximum and minimum reactive power generation capability limits of PV-node generators, maximum and minimum tap positions limits of tap changing transformers, and maximum power carrying capability limits of transmission lines, transformers in the power network, or alternatively read data of operating limits of power network components.

Step-20: Obtain on-line readings of real and reactive power assignments/schedules/specifications/settings at PQ-nodes, real power and voltage magnitude assignments/schedules/specifications/settings at PV-nodes and transformer turns ratios. These assigned/set values are controllable and are called controlled variables/parameters.

Step-30: Resulting voltage magnitudes and angles at power network nodes, power flows through various power network components, reactive power generations by generators and turns ratios of transformers in the power network are determined by performance of loadflow computation, for the assigned/set/given/known values from step-20 or previous process cycle step-60, of controlled variables/parameters.

Step-40: The results of Loadflow computation of step-30 are evaluated for any over loaded power network components like transmission lines and transformers, and over/under voltages at different nodes in the power system Step-50: If the system state is acceptable implying no over loaded transmission lines and transformers and no over/under voltages, the process branches to step-70, and if otherwise, then to step-60

Step-60: Changes the controlled variables/parameters set in step-20 or as later set by the previous process cycle step-60 and returns to step-30

Step-70: Actually implements the corrected controlled variables/parameters to obtain secure/correct/acceptable operation of power system Overload and under/over voltage alleviation functions produce changes in controlled variables/parameters in step-60 of FIG. 5. In other words controlled variables/parameters are assigned or changed to the new values in step-60. This correction in controlled variables/parameters could be even optimized in case of simulation of all possible imaginable disturbances including outage of a line and loss of generation for corrective action stored and made readily available for acting upon in case the simulated disturbance actually occurs in the power network. In fact simulation of all possible imaginable disturbances is the modern practice because corrective actions need be taken before the operation of individual protection of the power network components.

It is obvious that loadflow computation consequently is performed many times in real-time operation and control environment and, therefore, efficient and high-speed loadflow computation is necessary to provide corrective control in the changing power system conditions including an outage or failure of any of the power network components. Moreover, the loadflow computation must be highly reliable to yield converged solution under a wide range of system operating conditions and network parameters. Failure to yield converged loadflow solution creates blind spot as to what exactly could be happening in the network leading to potentially damaging operational and control decisions/actions in capital-intensive power utilities.

The power system control process shown in FIG. 5 is very general and elaborate. It includes control of power-flows through network components and voltage control at network nodes. However, the control of voltage magnitude at connected nodes within reactive power generation capabilities of electrical machines including generators, synchronous motors, and capacitor/inductor banks, and within operating ranges of transformer taps is normally integral part of loadflow computation as described in "LTC Transformers and MVAR violations in the Fast Decoupled Load Flow, IEEE Trans., PAS-101, No. 9, PP. 3328-3332, September 1982." If under/over voltage still exists in the results of loadflow computation, other control actions, manual or automatic, may be taken in step-60 in the above and in FIG. 5. For example, under voltage can be alleviated by shedding some of the load connected.

The prior art and present invention are described using the following symbols and terms:

$Y_{pq}=G_{pq}\text{'}jB_{pq}$: (p-q) th element of nodal admittance matrix without shunts $Y_{pp}=G_{pp}+jB_{pp}$: p-th diagonal element of nodal admittance matrix without shunts $y_p=g_p+jb_p$: total shunt admittance at any node-p $V_p=e_p+jf_p=V_p<\theta_p$: complex voltage of any node-p $\Delta\theta_p, \Delta V_p$: voltage angle, magnitude corrections $\Delta e_p, \Delta f_p$: real, imaginary components of voltage corrections $P_p+jQ_p$: net nodal injected power calculated $\Delta P_p+j\Delta Q_p$: nodal power residue or mismatch $RP_p+jRQ_p$: modified nodal power residue or mismatch $\Phi_p$: rotation or transformation angle

[RP]: vector of modified real power residue or mismatch

[RQ]: vector of modified reactive power residue or mismatch

[Yθ]: gain matrix of the P-θ loadflow sub-problem defined by eqn. (1)

[YV]: gain matrix of the Q-V loadflow sub-problem defined by eqn. (2)

m: number of PQ-nodes k: number of PV-nodes n=m+k+1: total number of nodes q>p: q is the node adjacent to node-p excluding the case of q=p

[ ]: indicates enclosed variable symbol to be a vector or a matrix

PQ-node: load-node, where, Real-Power-P and Reactive-Power-Q are specified

PV-node: generator-node, where, Real-Power-P and Voltage-Magnitude-V are specified Bold lettered symbols represent complex quantities in description.

Loadflow Computation: Each node in a power network is associated with four electrical quantities, which are voltage magnitude, voltage angle, real power, and reactive power. The loadflow computation involves calculation/determination of two unknown electrical quantities for other two given/specified/scheduled/set/known electrical quantities for each node. In other words the loadflow computation involves determination of unknown quantities in dependence on the given/specified/scheduled/set/known electrical quantities.

Loadflow Model: a set of equations describing the physical power network and its operation for the purpose of loadflow computation. The term 'loadflow model' can be alternatively referred to as 'model of the power network for loadflow computation'. The process of writing Mathematical equations that describe physical power network and its operation is called Mathematical Modeling. If the equations do not describe/represent the power network and its operation accurately the model is inaccurate, and the iterative loadflow computation method could be slow and unreliable in yielding converged loadflow computation. There could be variety of Loadflow Models depending on organization of set of equations describing the physical power network and its operation, including Decoupled Loadflow Models, Super Decoupled Loadflow (SDL) Models, Fast Super Decoupled Loadflow (FSDL) Model, and Novel Fast Super Decoupled Loadflow (NFSDL) Model.

Loadflow Method: sequence of steps used to solve a set of equations describing the physical power network and its operation for the purpose of loadflow computation is called Loadflow Method, which term can alternatively be referred to as 'loadflow computation method' or 'method of loadflow computation'. One word for a set of equations describing the physical power network and its operation is: Model. In other words, sequence of steps used to solve a Loadflow Model is a Loadflow Method. The loadflow method involves definition/formation of a loadflow model and its solution. There could be variety of Loadflow Methods depending on a loadflow model and iterative scheme used to solve the model including Decoupled Loadflow Methods, Super Decoupled Loadflow (SDL) Methods, Fast Super Decoupled Loadflow (FSDL) Method, and Novel Fast Super Decoupled Loadflow (NFSDL) Method. All decoupled loadflow methods described in this application use either successive (1θ, 1V) iteration scheme or simultaneous (1V, 1θ), defined in the following.

Prior art methods of loadflow computation of the kind carried out as step-30 in FIG. 5, are well known Gauss-Seidel Loadflow (GSL) and Super Super Decoupled Loadflow (SSDL) methods. The GSL method is well known to be not able to converge to high accuracy solution because of its iteration scheme that lacks self iterations, which realization led to the invention of Gauss-Seidel-Patel Loadflow (GSPL) method. The prior art methods will now the described.

Gauss-Seidel Loadflow: GSL

The complex power injected into the node-p of a power network is given by the following relation, $$P_p - jQ_p = V_p^* \sum_{q=1}^{n} Y_{pq} V_q = V_p^* Y_{pp} V_p + V_p^* \sum_{q>p} Y_{pq} V_q \quad (1)$$

Where, $$P_p = \text{Re}\left\{V_p^* \sum_{q=1}^{n} Y_{pq} V_q\right\} \quad (2)$$

$$Q_p = -\text{Im}\left\{V_p^* \sum_{q=1}^{n} Y_{pq} V_q\right\} \quad (3)$$

Where, words "Re" means "real part of" and words "Im" means "imaginary part of".

The Gauss-Seidel (GS) method is used to solve a set of simultaneous algebraic equations iteratively. The GSL-method calculates complex node voltage from any node-p relation (1) as given in relation (4).

$$V_p = \left[\{(PSH_p - jQSH_p)/V_p^*\} - \sum_{q>p} Y_{pq} V_q\right] / Y_{pp} \quad (4)$$

Iteration Process

Iterations start with the experienced/reasonable/logical guess for the solution. The reference node also referred to as the slack-node voltage being specified, starting voltage guess is made for the remaining (n−1)-nodes in n-node network. Node voltage value is immediately updated with its newly calculated value in the iteration process in which one node voltage is calculated at a time using latest updated other node voltage values. A node voltage value calculation at a time process is iterated over (n−1)-nodes in an n-node network, the reference/slack node voltage being specified not required to be calculated. Now, for the iteration-(r+1), the complex voltage calculation at node-p equation (4) and reactive power calculation at node-p equation (3), becomes $$V_p^{(r+1)} = \left[\begin{array}{c} \{(PSH_p - jQSH_p)/(V_p^*)^r\} - \\ \sum_{q=1}^{p-1} Y_{pq} V_q^{(r+1)} - \sum_{q=p+1}^{n} Y_{pq} V_q^r \end{array}\right] / Y_{pp} \quad (5)$$

$$Q_p^{(r+1)} = -\text{Im}\left\{(V_p^*)^r \sum_{q=1}^{p-1} Y_{pq} V_q^{(r+1)} - (V_q^*)^r \sum_{q=p}^{n} Y_{pq} V_q^r\right\} \quad (6)$$

Convergence

The iteration process is carried out until changes in the real and imaginary parts of the set of (n−1)-node voltages calculated in two consecutive iterations are all less than the specified tolerance—$\epsilon$, as shown in relations (7) and (8). The lower the value of the specified tolerance for convergence check, the greater the solution accuracy.

$$|\Delta e_p^{(r+1)}| = |e_p^{(r+1)} - e_p^r| < \epsilon \quad (7)$$

$$|\Delta f_p^{(r+1)}| = |f_p^{(r+1)} - f_p^r| < \epsilon \quad (8)$$

Accelerated Convergence

The GS-method being inherently slow to converge, it is characterized by the use of an acceleration factor applied to the difference in calculated node voltage between two consecutive iterations to speed-up the iterative solution process. The accelerated value of node-p voltage at iteration-(r+1) is given by $$V_p^{(r+1)}(\text{accelerated}) = V_p^r + \beta(V_p^{(r+1)} - V_p^r) \quad (9)$$

Where, $\beta$ is the real number called acceleration factor, the value of which for the best possible convergence for any given network can be determined by trial solutions. The GS-method is very sensitive to the choice of $\beta$, causing very slow convergence and even divergence for the wrong choice.

Scheduled or Specified Voltage at a PV-Node

Of the four variables, real power $PSH_p$ and voltage magnitude $VSH_p$ are specified at a PV-node. If the reactive power calculated using $VSH_p$ at the PV-node is within the upper and lower generation capability limits of a PV-node generator, it is capable of holding the specified voltage at its terminal. Therefore the complex voltage calculated by relation (5) by using actually calculated reactive power $Q_p$ in place of $QSH_p$ is adjusted to specified voltage magnitude by relation (10).

$$V_p^{(r+1)} = (VSH_p V_p^{(r+1)})/|V_p^{(r+1)}| \quad (10)$$

Calculation Steps of Gauss-Seidel Loadflow (GSL) Method

The steps of loadflow computation method, GSL method are shown in the flowchart of FIG. 1a. Referring to the flowchart of FIG. 1a, different steps are elaborated in steps marked with similar numbers in the following. The words "Read system data" in Step-1 correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

1. Read system data and assign an initial approximate solution. If better solution estimate is not available, set specified voltage magnitude at PV-nodes, 1.0 p.u. voltage magnitude at PQ-nodes, and all the node angles equal to that of the slack-node angle, which is referred to as the flat-start.
2. Form nodal admittance matrix, and Initialize iteration count r=1
3. Scan all the node of a network, except the slack-node whose voltage having been specified need not be calculated. Initialize node count p=1, and initialize maximum change in real and imaginary parts of node voltage variables DEMX=0.0 and DFMX=0.0
4. Test for the type of a node at a time. For the slack-node go to step-12, for a PQ-node go to the step-9, and for a PV-node follow the next step.
5. Compute $Q_p^{(r+1)}$ for use as an imaginary part in determining complex schedule power at a PV-node from relation (6) after adjusting its complex voltage for specified value by relation (10)
6. If $Q_p^{(r+1)}$ is greater than the upper reactive power generation capability limit of the PV-node generator, set $QSH_p$=the upper limit $Q_p^{max}$ for use in relation (5), and go to step-9. If not, follow the next step.
7. If $Q_p^{(r+1)}$ is less than the lower reactive power generation capability limit of the PV-node generator, set $QSH_p$=the lower limit $Q_p^{min}$ for use in relation (5), and go to step-9. If not, follow the next step.
8. Compute $V_p^{(r+1)}$ from relation (5) using $QSH_p = Q_p^{(r+1)}$, and adjust its value for specified voltage at the PV-node by relation (10), and go to step-10
9. Compute $V_p^{(r+1)}$ from relation (5)
10. Compute changes in the real and imaginary parts of the node-p voltage by using relations (7) and (8), and replace current value of DEMX and DFMX respectively in case any of them is larger.

11. Calculate accelerated value of $V_p^{(r+1)}$ by using relation (9), and update voltage by $V_p^r = V_p^{(r+1)}$ for immediate use in the next node voltage calculation.
12. Check for if the total numbers of nodes-n are scanned. That is if p<n, increment p=p+1, and go to step-4. Otherwise follow the next step.
13. If DEMX and DFMX both are not less than the convergence tolerance ($\epsilon$) specified for the purpose of the accuracy of the solution, advance iteration count r=r+1 and go to step-3, otherwise follow the next step
14. From calculated and known values of complex voltage at different power network nodes, and tap position of tap changing transformers, calculate power flows through power network components, and reactive power generation at PV-nodes.

Decoupled Loadflow

In a class of decoupled loadflow methods, each decoupled method comprises a system of equations (11) and (12) differing in the definition of elements of [RP], [RQ], and [Y$\theta$] and [YV]. It is a system of equations for the separate calculation of voltage angle and voltage magnitude corrections.

$$[RP] = [Y\theta][\Delta\theta] \quad (11)$$

$$[RQ] = [YV][\Delta V] \quad (12)$$

Successive (1$\theta$, 1V) Iteration Scheme

In this scheme (11) and (12) are solved alternately with intermediate updating. Each iteration involves one calculation of [RP] and [$\Delta\theta$] to update [$\theta$] and then one calculation of [RQ] and [$\Delta V$] to update [V]. The sequence of relations (13) to (16) depicts the scheme.

$$[\Delta\theta] = [Y\theta]^{-1}[RP] \quad (13)$$

$$[\theta] = [\theta] + [\Delta\theta] \quad (14)$$

$$[\Delta V] = [YV]^{-1}[RQ] \quad (15)$$

$$[V] = [V] + [\Delta V] \quad (16)$$

The scheme involves solution of system of equations (11) and (12) in an iterative manner depicted in the sequence of relations (13) to (16). This scheme requires mismatch calculation for each half-iteration; because [RP] and [RQ] are calculated always using the most recent voltage values and it is block Gauss-Seidel approach. The scheme is block successive, which imparts increased stability to the solution process. This in turn improves convergence and increases the reliability of obtaining solution.

Super Super Decoupled Loadflow: SSDL

This method is not very sensitive to the restriction applied to nodal transformation angles; SSDL restricts transformation angles to the maximum of $-48$ degrees determined experimentally for the best possible convergence from non linearity considerations, which is depicted by relations (19) and (20). However, it gives closely similar performance over wide range of restriction applied to the transformation angles say, from $-36$ to $-90$ degrees.

$$RP_p = (\Delta P_p \cos\Phi_p + \Delta Q_p \sin\Phi_p)/V_p^2 \quad \text{—for PQ-nodes} \quad (17)$$

$$RQ_p = (\Delta Q_p \cos\Phi_p - \Delta P_p \sin\Phi_p)/V_p \quad \text{—for PQ-nodes} \quad (18)$$

$$\cos\Phi_p = \text{Absolute}(B_{pp}/\sqrt{(G_{pp}^2 + B_{pp}^2)}) \geq \cos(-48°) \quad (19)$$

$$\sin\Phi_p = -\text{Absolute}(G_{pp}/\sqrt{(G_{pp}^2 + B_{pp}^2)}) \geq \sin(-48°) \quad (20)$$

$$RP_p = \Delta P_p/(K_p V_p^2) \quad \text{—for PV-nodes} \quad (21)$$

$$K_p = \text{Absolute}(B_{pp}/Y\theta_{pp}) \quad (22)$$

$$Y\theta_{pq} = \begin{cases} -Y_{pq} & \text{-for branch } r/x \text{ ratio} \leq 3.0 \\ -(B_{pq} + 0.9(Y_{pq} - B_{pq})) & \text{-for branch } r/x \text{ ratio} > 3.0 \\ -B_{pq} & \text{-for branches connected between two } PV\text{-nodes or a } PV\text{-node and the slack-node} \end{cases} \quad (23)$$

$$YV_{pq} = \begin{cases} -Y_{pq} & \text{-for branch } r/x \text{ ratio} \leq 3.0 \\ -(B_{pq} + 0.9(Y_{pq} - B_{pq})) & \text{-for branch } r/x \text{ ratio} > 3.0 \end{cases} \quad (24)$$

$$Y\theta_{pp} = \sum_{q>p} -Y\theta_{pq} \text{ and } YV_{pp} = b'_p + \sum_{q>p} -YV_{pq} \quad (25)$$

$$b'_p = (QSH_p \cos\Phi_p - PSH_p \sin\Phi_p/V_s^2) - b_p \cos\Phi_p \text{ or}$$
$$b'_p = 2(QSH_p \cos\Phi_p - PSH_p \sin\Phi_p)/V_s^2 \quad (26)$$

$$b'_p = (QSH_p \cos\Phi_p - PSH_p \sin\Phi_p/V_s^2) - b_p \cos\Phi_p \text{ or}$$
$$b'_p = 2(QSH_p \cos\Phi_p - PSH_p \sin\Phi_p)/V_s^2 \quad (26)$$

where, $K_p$ is defined in relation (22), which is initially restricted to the minimum value of 0.75 determined experimentally; however its restriction is lowered to the minimum value of 0.6 when its average over all less than 1.0 values at PV nodes is less than 0.6. Restrictions to the factor $K_p$ as stated in the above is system independent. However it can be tuned for the best possible convergence for any given system. In case of systems of only PQ-nodes and without any PV-nodes, equations (23) and (24) simply be taken as $Y\theta_{pq} = YV_{pq} = -Y_{pq}$.

Branch admittance magnitude in (23) and (24) is of the same algebraic sign as its susceptance. Elements of the two gain matrices differ in that diagonal elements of [YV] additionally contain the b' values given by relations (25) and (26) and in respect of elements corresponding to branches connected between two PV-nodes or a PV-node and the slack-node. Relations (19) and (20) with inequality sign implies that transformation angles are restricted to maximum of $-48$ degrees for SSDL. The method consists of relations (11) to (26). In two simple variations of the SSDL method, one is to make $YV_{pq} = Y\theta_{pq}$ and the other is to make $Y\theta_{pq} = YV_{pq}$.

Calculation Steps of Super Super Decoupled Loadflow (SSDL) Method

The steps of loadflow computation method, SSDL method are shown in the flowchart of FIG. 1b. Referring to the flowchart of FIG. 1b, different steps are elaborated in steps marked with similar letters in the following. The words "Read system data" in Step-1 correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

a. Read system data and assign an initial approximate solution. If better solution estimate is not available, set voltage magnitude and angle of all nodes equal to those of the slack-node. This is referred to as the slack-start.
b. Form nodal admittance matrix, and Initialize iteration count ITRP=ITRQ=r=0
c. Compute Cosine and Sine of nodal rotation angles using relations (19) and (20), and store them. If they, respectively, are less than the Cosine and Sine of −48 degrees, equate them, respectively, to those of −48 degrees.
d. Form (m+k)×(m+k) size matrices [Yθ] and [YV] of (11) and (12) respectively each in a compact storage exploiting sparsity. The matrices are formed using relations (23), (24), (25), and (26). In [YV] matrix, replace diagonal elements corresponding to PV-nodes by very large value (say, 10.0**10). In case [YV] is of dimension (m×m), this is not required to be performed. Factorize [Yθ] and [YV] using the same ordering of nodes regardless of node-types and store them using the same indexing and addressing information. In case [YV] is of dimension (m×m), it is factorized using different ordering than that of [Yθ].
e. Compute residues [ΔP] at PQ- and PV-nodes and [ΔQ] at only PQ-nodes. If all are less than the tolerance (ε), proceed to step-n. Otherwise follow the next step.
f. Compute the vector of modified residues [RP] as in (17) for PQ-nodes, and using (21) and (22) for PV-nodes.
g. Solve (13) for [Δθ] and update voltage angles using, [θ]=[θ]+[Δθ].
h. Set voltage magnitudes of PV-nodes equal to the specified values, and Increment the iteration count ITRP=ITRP+1 and r=(ITRP+ITRQ)/2.
i. Compute residues [ΔP] at PQ- and PV-nodes and [ΔQ] at PQ-nodes only. If all are less than the tolerance (ε), proceed to step-n. Otherwise follow the next step.
j. Compute the vector of modified residues [RQ] as in (18) for only PQ-nodes.
k. Solve (15) for [ΔV] and update PQ-node magnitudes using [V]=[V]+[ΔV]. While solving equation (15), skip all the rows and columns corresponding to PV-nodes.
l. Calculate reactive power generation at PV-nodes and tap positions of tap changing transformers. If the maximum and minimum reactive power generation capability and transformer tap position limits are violated, implement the violated physical limits and adjust the loadflow solution.
m. Increment the iteration count ITRQ=ITRQ+1 and r=(ITRP+ITRQ)/2, and Proceed to step-e.
n. From calculated and known values of voltage magnitude and voltage angle at different power network nodes, and tap position of tap changing transformers, calculate power flows through power network components, and reactive power generation at PV-nodes.

SUMMARY OF THE INVENTION

It is a primary object of the present invention to improve solution accuracy, convergence and efficiency of the prior art GSL and SSDL computations method under wide range of system operating conditions and network parameters for use in power flow control and voltage control in the power system.

The above and other objects are achieved, according to the present invention, with Gauss-Seidel-Patel loadflow (GSPL), the prior art Super Super Decoupled Loadflow (SSDL) and their parallel versions PGSPL, PSSDL loadflow computation methods for Electrical Power. System. In context of voltage control, the inventive system of parallel loadflow computation for Electrical Power system consisting of plurality of electromechanical rotating machines, transformers and electrical loads connected in a network, each machine having a reactive power characteristic and an excitation element which is controllable for adjusting the reactive power generated or absorbed by the machine, and some of the transformers each having a tap changing element, which is controllable for adjusting turns ratio or alternatively terminal voltage of the transformer, said system comprising:

means for defining and solving loadflow model of the power network characterized by inventive PGSPL or PSSDL model for providing an indication of the quantity of reactive power to be supplied by each generator including the reference/slack node generator, and for providing an indication of turns ratio of each tap-changing transformer in dependence on the obtained-online or given/specified/set/known controlled network variables/parameters, and physical limits of operation of the network components, means for machine control connected to the said means for defining and solving loadflow model and to the excitation elements of the rotating machines for controlling the operation of the excitation elements of machines to produce or absorb the amount of reactive power indicated by said means for defining and solving loadflow model in dependence on the set of obtained-online or given/specified/set controlled network variables/parameters, and physical limits of excitation elements, means for transformer tap position control connected to said means for defining and solving loadflow model and to the tap changing elements of the controllable transformers for controlling the operation of the tap changing elements to adjust the turns ratios of transformers indicated by the said means for defining and solving loadflow model in dependence on the set of obtained-online or given/specified/set controlled network variables/parameters, and operating limits of the tap-changing elements.

The method and system of voltage control according to the preferred embodiment of the present invention provide voltage control for the nodes connected to PV-node generators and tap changing transformers for a network in which real power assignments have already been fixed. The said voltage control is realized by controlling reactive power generation and transformer tap positions.

The inventive system of parallel loadflow computation can be used to solve a model of the Electrical Power System for voltage control. For this purpose real and reactive power assignments or settings at PQ-nodes, real power and voltage magnitude assignments or settings at PV-nodes and transformer turns ratios, open/close status of all circuit breaker, the reactive capability characteristic or curve for each machine, maximum and minimum tap positions limits of tap changing transformers, operating limits of all other network components, and the impedance or admittance of all lines are supplied. GSPL or SSDL loadflow equations are solved by a parallel iterative process until convergence. During this solution the quantities which can vary are the real and reactive power at the reference/slack node, the reactive power set points for each PV-node generator, the transformer transformation ratios, and voltages on all PQ-nodes nodes, all being held within the specified ranges. When the iterative process converges to a solution, indications of reactive power generation at PV-nodes and transformer turns-ratios or tap-settings are provided. Based on the known reactive power capability characteristics of each PV-node generator, the determined reactive power values are used to adjust the excitation current to each generator to establish the reactive power set points. The transformer taps are set in accordance with the turns ratio indication provided by the system of loadflow computation.

For voltage control, system of parallel GSPL or SSDL computation can be employed either on-line or off-line. In off-line operation, the user can simulate and experiment with various sets of operating conditions and determine reactive power generation and transformer tap settings requirements. An invented parallel computer System can implement any of the parallel loadflow computation methods. For on-line operation, the loadflow computation system is provided with data identifying the current real and reactive power assignments and transformer transformation ratios, the present status of all switches and circuit breakers in the network and machine characteristic curves in steps-10 and -20 in FIG. 5, and steps 12, 20, 32, 44, and 50 in FIG. 6 described below. Based on this information, a model of the system provide the values for the corresponding node voltages, reactive power set points for each machine and the transformation ratio and tap changer position for each transformer.

Inventions include Gauss-Seidel-Patel Loadflow (GSPL) method for the solution of complex simultaneous algebraic power injection equations or any set, of complex simultaneous algebraic equations arising in any other subject areas. Further inventions are a technique of decomposing a network into sub-networks for the solution of sub-networks in parallel referred to as Suresh's diakoptics, a technique of relating solutions of sub-networks into network wide solution, and a best possible parallel computer architecture ever invented to carry out solution of sub-networks in parallel.

BRIEF DESCRIPTION OF DRAWINGS

FIG. 1 is a flow-charts of the prior art GSL and SSDL methods

FIG. 2 is a one-line diagram of IEEE 14-node network and its decomposition into level-1 connectivity sub-networks FIG. 3 is a flow-charts embodiment of the invented GSPL, PGSPL methods FIG. 4 is a block diagram of invented parallel computer architecture/organization FIG. 5 prior art is a flow-chart of the overall controlling method for an electrical power system involving loadflow computation as a step which can be executed using one of the invented loadflow computation method of FIG. 3.

FIG. 6 prior art is a flow-chart of the simple special case of voltage control system in overall controlling system of FIG. 5 for an electrical power system FIG. 7 prior art is a one-line diagram of an exemplary 6-node power network having a reference/slack/swing node, two PV-nodes, and three PQ-nodes

DESCRIPTION OF A PREFERRED EMBODIMENT

A loadflow computation is involved as a step in power flow control and/or voltage control in accordance with FIG. 5 or FIG. 6. A preferred embodiment of the present invention is described with reference to FIG. 7 as directed to achieving voltage control.

FIG. 7 is a simplified one-line diagram of an exemplary utility power network to which the present invention may be applied. The fundamentals of one-line diagrams are described in section 6.11 of the text ELEMENTS OF POWER SYSTEM ANALYSIS, forth edition, by William D. Stevenson, Jr., McGrow-Hill Company, 1982. In FIG. 7, each thick vertical line is a network node. The nodes are interconnected in a desired manner by transmission lines and transformers each having its impedance, which appears in the loadflow models. Two transformers in FIG. 7 are equipped with tap changers to control their turns ratios in order to control terminal voltage of node-1 and node-2 where large loads are connected.

Node-6 is a reference node alternatively referred to as the slack or swing-node, representing the biggest power plant in a power network. Nodes-4 and -5 are PV-nodes where generators are connected, and nodes-1, -2, and -3 are PQ-nodes where loads are connected. It should be noted that the nodes-4, -5, and -6 each represents a power plant that contains many generators in parallel operation. The single generator symbol at each of the nodes-4, -5, and -6 is equivalent of all generators in each plant. The power network further includes controllable circuit breakers located at each end of the transmission lines and transformers, and depicted by cross markings in one-line diagram of FIG. 7. The circuit breakers can be operated or in other words opened or closed manually by the power system operator or relevant circuit breakers operate automatically consequent of unhealthy or faulty operating conditions. The operation of one or more circuit breakers modify the configuration of the network. The arrows extending certain nodes represent loads.

A goal of the present invention is to provide a reliable and computationally efficient loadflow computation that appears as a step in power flow control and/or voltage control systems of FIG. 5 and FIG. 6. However, the preferred embodiment of loadflow computation as a step in control of terminal node voltages of PV-node generators and tap-changing transformers is illustrated in the flow diagram of FIG. 6 in which present invention resides in function steps 60 and 62.

Short description of other possible embodiment of the present invention is also provided herein. The present invention relates to control of utility/industrial power networks of the types including plurality of power plants/generators and one or more motors/loads, and connected to other external utility. In the utility/industrial systems of this type, it is the usual practice to adjust the real and reactive power produced by each generator and each of the other sources including synchronous condensers and capacitor/inductor banks, in order to optimize the real and reactive power generation assignments of the system. Healthy or secure operation of the network can be shifted to optimized operation through corrective control produced by optimization functions without violation of security constraints. This is referred to as security constrained optimization of operation. Such an optimization is described in the U.S. Pat. No. 5,081,591 dated Jan. 13, 1992: "Optimizing Reactive Power Distribution in an Industrial Power Network", where the present invention can be embodied by replacing the step nos. 56 and 66 each by a step of constant gain matrices [Yθ] and [YV], and replacing steps of "Exercise Newton-Raphson Algorithm" by steps of "Exercise parallel GSPL or SSDL Computation" in places of steps 58 and 68. This is just to indicate the possible embodiment of the present invention in optimization functions like in many others including state estimation function. However, invention is being claimed through a simplified embodiment without optimization function as in FIG. 6 in this application. The inventive steps-60 and -62 in FIG. 6 are different than those corresponding steps-56, and -58, which constitute a well known Newton-Raphson loadflow method, and were not inventive even in U.S. Pat. No. 5,081,591.

In FIG. 6, function step 10 provides stored impedance values of each network component in the system. This data is modified in a function step 12, which contains stored information about the open or close status of each circuit breaker. For each breaker that is open, the function step 12 assigns very high impedance to the associated line or transformer. The resulting data is than employed in a function step 14 to establish an admittance matrix for the power network. The data provided by function step 10 can be input by the computer operator from calculations based on measured values of impedance of each line and transformer, or on the basis of impedance measurements after the power network has been assembled.

Each of the transformers T1 and T2 in FIG. 7 is a tap changing transformer having a plurality of tap positions each representing a given transformation ratio. An indication of initially assigned transformation ratio for each transformer is provided by function step 20.

The indications provided by function steps 14, and 20 are supplied to a function step 60 in which constant gain matrices [Yθ] and [YV] of any of the invented super decoupled loadflow models are constructed, factorized and stored. The gain matrices [Yθ] and [YV] are conventional tools employed for solving Super Decoupled Loadflow model defined by equations (1) and (2) for a power system.

Indications of initial reactive power, or Q on each node, based on initial calculations or measurements, are provided by a function step 30 and these indications are used in function step 32, to assign a Q level to each generator and motor. Initially, the Q assigned to each machine can be the same as the indicated Q value for the node to which that machine is connected.

An indication of measured real power, P, on each node is supplied by function step 40. Indications of assigned/specified/scheduled/set generating plant loads that are constituted by known program are provided by function step 42, which assigns the real power, P, load for each generating plant on the basis of the total P which must be generated within the power system. The value of P assigned to each power plant represents an economic optimum, and these values represent fixed constraints on the variations, which can be made by the system according to the present invention. The indications provided by function steps 40 and 42 are supplied to function step 44 which adjusts the P distribution on the various plant nodes accordingly. Function step 50 assigns initial approximate or guess solution to begin iterative method of loadflow computation, and reads data file of operating limits on power network components, such as maximum and minimum reactive power generation capability limits of PV-nodes generators.

The indications provided by function steps 32, 44, 50 and 60 are supplied to function step 62 where inventive Fast Super Decoupled Loadflow computation or Novel Fast Super Decoupled Loadflow computation is carried out, the results of which appear in function step 64. The loadflow computation yields voltage magnitudes and voltage angles at PQ-nodes, real and reactive power generation by the reference/slack/swing node generator, voltage angles and reactive power generation indications at PV-nodes, and transformer turns ratio or tap position indications for tap changing transformers. The system stores in step 62 a representation of the reactive capability characteristic of each PV-node generator and these characteristics act as constraints on the reactive power that can be calculated for each PV-node generator for indication in step 64. The indications provided in step 64 actuate machine excitation control and transformer tap position control. All the loadflow computation methods using SSDL models can be used to effect efficient and reliable voltage control in power systems as in the process flow diagram of FIG. 6.

Inventions include Gauss-Seidel-Patel Loadflow (GSPL) method for the solution of complex simultaneous algebraic power injection equations or any set of complex simultaneous algebraic equations arising in any other subject areas. Further inventions are a technique of decomposing a network into sub-networks for the solution of sub-networks in parallel referred to as Suresh's diakoptics, a technique of relating solutions of sub-networks into network wide solution, and a best possible parallel computer architecture ever invented to carry out solution of sub-networks in parallel.

Gauss-Seidel-Patel Loadflow: GSPL

Gauss-Seidel numerical method is well-known to be not able to converge to the high accuracy solution, which problem has been resolved for the first-time in the proposed Gauss-Seidel-Patel (GSP) numerical method.

The GSP method introduces the concept of self-iteration of each calculated variable until convergence before proceeding to calculate the next. This is achieved by replacing relation (5) by relation (27) stated in the following where self-iteration-(sr+1) over a node variable itself within the global iteration-(r+1) over (n−1) nodes in the n-node network is depicted. During the self-iteration process only $v_p$ changes without affecting any of the terms involving $v_q$. At the start of the self-iteration $V_p^{sr} = V_p^r$ and at the convergence of the self-iteration $V_p^{(r+1)} = V_p^{(sr+1)}$.

$$(V_p^{(sr+1)})^{(r+1)} = [\{(PSH_p - jQSH_p)/((V_p^*)^{sr})^r\} - \sum_{q=1}^{p-1} Y_{pq} V_q^{(r+1)} - \sum_{q=p+1}^{n} Y_{pq} V_q^r] / Y_{pp} \quad (27)$$

Self-Convergence

The self-iteration process is carried out until changes in the real and imaginary parts of the node-p voltage calculated in two consecutive self-iterations are less than the specified tolerance. It has been possible to establish a relationship between the tolerance specification for self-convergence and the tolerance specification for global-convergence. It is found sufficient for the self-convergence tolerance specification to be ten times the global-convergence tolerance specification.

$$|\Delta e_p^{(sr+1)}| = |e_p^{(sr+1)} - e_p^{sr}| < 10\epsilon \quad (28)$$

$$|\Delta f_p^{(sr+1)}| = |f_p^{(sr+1)} - f_p^{sr}| < 10\epsilon \quad (29)$$

For the global-convergence tolerance specification of 0.000001, it has been found sufficient to have the self-convergence tolerance specification of 0.00001 in order to have the maximum real and reactive power mismatches of 0.0001 in the converged solution. However, for small networks under not difficult to solve conditions they respectively could be 0.00001 and 0.0001 or 0.000001 and 0.0001, and for large networks under difficult to solve conditions they sometimes need to be respectively 0.0000001 and 0.000001.

Network Decomposition Technique: Suresh's Diakoptics

A network decomposition technique referred to as Suresh's diakoptics involves determining a sub-network for each node involving directly connected nodes referred to as level-1 nodes and their directly connected nodes referred to as level-2 nodes and so on. The level of outward connectivity for local solution of a sub-network around a given node is to be determined experimentally. This is particularly true for gain matrix based methods such as Newton-Raphson (NR), SSDL methods. Sub-networks can be solved by any of the known methods including Gauss-Seidel-Patel Loadflow (GSPL) method.

In the case of GSPL-method only one level of outward connectivity around each node is found to be sufficient for the formation of sub-networks equal to the number of nodes. Level-1 connectivity sub-networks for IEEE 14-node network is shown in FIG. 2b. The local solution of equations of each sub-network could be iterated for experimentally determined two or more iteration. However, maximum of two iterations are fond to be sufficient. In case of GSPL-method, processing load on processors can be attempted equalization by assigning two or more smaller sub-networks to the single processor for solving separately in sequence.

Sometimes it is possible that a sub-network around any given node could be a part of the sub-network around another node making it redundant needing local solution of less than (m+k) sub-networks in case of gain matrix based methods like SSDL. Level-1 connectivity sub-networks for IEEE 14-node for parallel solution by say, SSDL-method is shown in FIG. 2b. The local solution iteration over a sub-network is not required for gain matrix based methods like SSDL. FIG. 2c shows the grouping of the non-redundant sub-networks in FIG. 2b in an attempt to equalize size of the sub-networks reducing the number of processors without increasing time for the solution of the whole network.

It should be noted that no two decomposed network parts contain the same set of nodes, or the same set of lines connected to nodes, though some same nodes could appear in two or more sub-networks.

Decomposing network in level-1 connectivity sub-networks provides for maximum possible parallelism, and hopefully fastest possible solution. However, optimum outward level of connectivity around a node sub-network can be determined experimentally for the solution of large networks by a gain matrix based method like SSDL.

Relating Sub-Network Solutions to Get the Network-Wide Global Solution

Suresh's decomposition subroutine run by server-processor decomposes the network into sub-networks and a separate processor is assigned to solve each sub-network simultaneously in parallel. A node-p of the network could be contained in two or more sub-networks. Say a node-p is contained in or part of 'q' sub-networks. If GSPL-method is used, voltage calculation for a node-p is performed by each of the 'q' sub-networks. Add 'q' voltages calculated for a node-p by 'q' number of sub-networks and divide by 'q' to take an average as given by relation (30).

$$V_p^{(r+1)} = (V_{p1}^{(r+1)} + V_{p2}^{(r+1)} + V_{p3}^{(r+1)} + \ldots + V_{pq}^{(r+1)})/q \quad (30)$$

If a gain matrix based method like SSDL is used, voltage angle correction and voltage magnitude correction calculation for a node-p is performed by each of the 'q' sub-networks in which node-p is contained. Add 'q' voltage angle corrections and 'q' voltage magnitude corrections calculated for the node-p by 'q' sub-networks and divide by number 'q' to take average as given by relations (31) and (32).

$$\Delta\theta_p^{(r+1)} = (\Delta\theta_{p1}^{(r+1)} + \Delta\theta_{p2}^{(r+1)} + \Delta\theta_{p3}^{(r+1)} + \ldots + \Delta\theta_{pq}^{(r+1)})/q \quad (31)$$

$$\Delta V_p^{(r+1)} = (\Delta V_{p1}^{(r+1)} + \Delta V_{p2}^{(r+1)} + \Delta V_{p3}^{(r+1)} + \ldots + \Delta V_{pq}^{(r+1)})/q \quad (32)$$

Sometimes, gain matrix based methods can be organized to directly calculate real and imaginary components of complex node voltages or GSPL-method can be decoupled into calculating real ($e_p$) and imaginary ($f_p$) components of complex voltage calculation for a node-p, which is contributed to by each of the 'q' sub-networks in which node-p is contained. Add 'q' real parts of voltages calculated for a node-p by 'q' sub-networks and divide by number 'q'. Similarly, add 'q' imaginary parts of voltages calculated for the same node-p by 'q' sub-networks and divide by number 'q' to take an average as given by relation (33) and (34).

$$e_p^{(r+1)} = (e_{p1}^{(r+1)} + e_{p2}^{(r+1)} + e_{p3}^{(r+1)} + \ldots + e_{pq}^{(r+1)})/q \quad (33)$$

$$f_p^{(r+1)} = (f_{p1}^{(r+1)} + f_{p2}^{(r+1)} + f_{p3}^{(r+1)} + \ldots + f_{pq}^{(r+1)})/q \quad (34)$$

The relations (30) to (34), can also alternatively be written as relations (35) to (39).

$$V_p^{(r+1)} = \sqrt{(Re((V_{p1}^{(r+1)})^2) + Re((V_{p2}^{(r+1)})^2) + \ldots + Re((V_{pq}^{(r+1)})^2))/q} + j\sqrt{(Im((V_{p1}^{(r+1)})^2) + Im((V_{p2}^{(r+1)})^2) + \ldots + Im((V_{pq}^{(r+1)})^2))/q} \quad (35)$$

$$\Delta\theta_p^{(r+1)} = \sqrt{((\Delta\theta_{p1}^{(r+1)})^2 + (\Delta\theta_{p2}^{(r+1)})^2 + \ldots + (\Delta\theta_{pq}^{(r+1)})^2)/q} \quad (36)$$

$$\Delta V_p^{(r+1)} = \sqrt{((\Delta V_{p1}^{(r+1)})^2 + (\Delta V_{p2}^{(r+1)})^2 + \ldots + (\Delta V_{pq}^{(r+1)})^2)/q} \quad (37)$$

$$e_p^{(r+1)} = \sqrt{((e_{p1}^{(r+1)})^2 + (e_{p2}^{(r+1)})^2 + \ldots + (e_{pq}^{(r+1)})^2)/q} \quad (38)$$

$$f_p^{(r+1)} = \sqrt{((f_{p1}^{(r+1)})^2 + (f_{p2}^{(r+1)})^2 + \ldots + (f_{pq}^{(r+1)})^2)/q} \quad (39)$$

Mathematically, square of any positive or negative number is positive. Therefore, in the above relations if the original not-squared value of any number is negative, the same algebraic sign is attached after squaring that number. Again if the mean of squared values turns out to be a negative number, negative sign is attached after taking the square root of the unsigned number.

Parallel Computer Architecture

The Suresh's diakoptics along with the technique of relating sub-network solution estimate to get the global solution estimate does not require any communication between processors assigned to solve each sub-network. All processors access the commonly shared memory through possibly separate port for each processor in a multi-port memory organization to speed-up the access. Each processor access the commonly shared memory to write results of local solution of sub-network assigned to contribute to the generation of network-wide or global solution estimate. The generation of global solution estimate marks the end of iteration. The iteration begins by processors accessing latest global solution estimate for local solution of sub-networks assigned. That means only beginning of the solution of sub-networks by assigned processors need to be synchronized in each iteration, which synchronization can be affected by server-processor.

There are two possible approaches of achieving parallel processing for a problem. The first is to design and develop a solution technique for the best possible parallel processing of a problem and then design parallel computer organization/architecture to achieve it. The second is to design and develop parallel processing of solution technique that can best be carried out on any of the existing available parallel computer. The inventions of this application follow the first approach. The trick is in breaking the large problem into small pieces of sub-problems, and solving sub-problems each on a separate processor simultaneously in parallel, and then relating solution of sub-problems into obtaining global solution of the original whole problem. That exactly is achieved by the inventions of Suresh's diakoptics of breaking the large network into small pieces of sub-networks, and solving sub-networks each on a separate processor simultaneously in parallel, and then by the technique of relating solutions of sub-networks into obtaining network wide global solution of the original whole network.

Invented technique of parallel loadflow computation can best be carried out on invented parallel computer architecture of FIG. 4. The main inventive feature of the architecture of FIG. 4 is that processors are not required to communicate with each other and provision of private local main memory for each processor for local solution of sub-problem for contribution to the generation of network wide global solution in commonly shared main memory. Other applications can be developed that can best be carried out using the parallel computer architecture of FIG. 4.

FIG. 4 is the generalized and simplified block diagram of a multiprocessor computer system comprising few to thousands of processors meaning the value of number 'n' in 'processor-n' could be small to in the range of thousands. The invention of the server processor-array processor architecture of the computer of FIG. 4 comprises a multiprocessor system with processors and input/output (I/O) adapter coupled, by a common bus arrangement, to the commonly shared main memory. One of the processors is the main/server processor coupled to the I/O adapter, which is only one for the system and coupled to the I/O devices. The I/O adapter and I/O devices are not explicitly shown but are considered to have been included in the block marked I/O unit. Similarly, dedicated cache memories if required for each processor and I/O adapter are considered to have been included in each processor block and the block of I/O unit. Each processor is also provided with its private local main memory for local processing, and it is not visible or accessible to any other processor or I/O unit. The FIG. 4 also explicitly depicts that no communication of any short is required between processors except that each processor communicates only with the main/server processor for control and coordination purposes. All connecting lines with arrows at each end indicates two way asynchronous communication.

Distributed Computing Architecture

The parallel computer architecture depicted in FIG. 4 land itself into distributed computing architecture. This is achieved when each processor and associated memory forming a self-contained computer in itself is physically located at each network node or a substation, and communicates over communication lines with commonly shared memory and server processor both located at central station or load dispatch center in a power network. It is possible to have an input/output unit with a computer at each network node or substation, which can be used to read local sub-network data in parallel and communicate over communication line to commonly shared memory for the formation and storage of network wide global data at the central load dispatch center in the power network.

CONCLUSION

The inventions of Suresh's diakoptics, technique of relating local solution of sub-networks into network-wide global solution, and parallel computer architecture depicted in FIG. 4 afford an opportunity for the maximum possible parallelism with minimum possible communication and synchronization requirements. Also parallel computer architecture and parallel computer program are scalable, which is not possible with most of the parallel computers built so far. Moreover, these inventions provide bridging and unifying model for parallel computation.

Calculation Steps for Parallel Gauss-Seidel-Patel Loadflow Method

The steps of parallel Gauss-Seidel-Patel loadflow (PG-SPL) computation method, using invented parallel computer of FIG. 4 are shown in the flowchart of FIG. 3b. Referring to the flowchart of FIG. 3b, different steps are elaborated in steps marked with similar numbers in the following. The words "Read system data" in Step-1 correspond to step-10 and step-20 in FIG. 5, and step-14, step-20, step-32, step-44, step-50 in FIG. 6. All other steps in the following correspond to step-30 in FIG. 5, and step-60, step-62, and step-64 in FIG. 6.

21. Read system data and assign an initial approximate solution. If better solution estimate is not available, set specified voltage magnitude at PV-nodes, 1.0 p.u. voltage magnitude at PQ-nodes, and all the node angles equal to that of the slack-node, which is referred to as the flat-start. The solution guess is stored in complex voltage vector say, V (I) where "I" takes values from 1 to n, the number of nodes in the whole network.

22. All processors simultaneously access network-wide global data stored in commonly shared memory, which can be under the control of server-processor, to form and locally store required admittance matrix for each sub-network.

23. Initialize complex voltage vector, say VV (I)=CMPLEX (0.0, 0.0) that receives solution contributions from sub-networks.

24. All processors simultaneously access network-wide global latest solution estimate vector V (I) available in the commonly shared memory to read into the local processor memory the required elements of the vector V (I), and perform 2-iterations of the GSPL-method in parallel for each sub-network to calculate node-voltages.

25. As soon as 2-iterations are performed for a sub-network, its new local solution estimate is contributed to the vector VV (I) in commonly shared memory under the control of server processor without any need for the synchronization. It is possible that small sub-network finished 2-iterations and already contributed to the vector VV (I) while 2-iterations are still being performed for the larger sub-network.

26. Contribution from a sub-network to the vector VV (I) means, the complex voltage estimate calculated for the nodes of the sub-network are added to the corresponding elements of the vector VV (I). After all sub-networks finished 2-iterations and contributed to the vector VV (I), its each element is divided by the number of contributions from all sub-networks to each element or divided by number of nodes directly connected to the node represented by the vector element, leading to the transformation of vector VV (I) into the new network-wide global solution estimate. This operation is performed as indicated in relation (30) or (35). This step requires synchronization in that the division operation on each element of the vector VV(I) can be performed only after all sub-networks are solved and have made their contribution to the vector VV(I).

27. Find the maximum difference in the real and imaginary parts of [VV(I)−V(I)]

28. Calculate accelerated value of VV(I) by relation (9) as VV(I)=V(I)+β[VV(I)−V(I)] and perform V(I)=VV(I)

29. If the maximum difference calculated in step-27 is not less than certain solution accuracy tolerance specified as stopping criteria for the iteration process, increment iteration count and go to step-23, or else follow the next step.

30. From calculated values of complex voltage at different power network nodes, and tap position of tap changing transformers, calculate power flows through power network components, and reactive power generation at PV-nodes.

It can be seen that steps-22, -24, and -25 are performed in parallel. While other steps are performed by the server-processor. However, with the refined programming, it is possible to delegate some of the server-processor tasks to the parallel-processors. For example, any assignment functions of step-21 and step-22 can be performed in parallel. Even reading of system data can be performed in parallel particularly in distributed computing environment where each sub-network data can be read in parallel by substation computers connected to operate in parallel.

Calculation Steps for Parallel Super Super Decoupled Loadflow Method

The steps of Parallel Super Super Decoupled Loadflow (PSSDL) computation method using invented parallel computer of FIG. 4 are given in the following without giving its flowchart.

41. Read system data and assign an initial approximate solution. If better solution estimate is not available, set all node voltage magnitudes and all node angles equal to those of the slack-node, which is referred to as the slack-start. The solution guess is stored in voltage magnitude and angle vectors say, VM (I) and VA(I) where "I" takes values from 1 to n, the number of nodes in the whole network.
42. All processors simultaneously access network-wide global data stored in commonly shared memory, which can be under the control of server-processor to form and locally store required admittance matrix for each sub-network. Form gain matrices of SSDL-method for each sub-network, factorize and store them locally in the memory associated with each processor.
43. Initialize vectors, say DVM (I)=0.0, and DVA(I)=0.0 that receives respectively voltage magnitude corrections and voltage angle corrections contributions from sub-networks.
44. Calculate real and reactive power mismatches for all the nodes in parallel, find real power maximum mismatch and reactive power maximum mismatch by the server-computer. If both the maximum values are less then convergence tolerance specified, go to step-49. Otherwise, follow the next step.
45. All processors simultaneously access network-wide global latest solution estimate VM(I) and VA(I) available in the commonly shared memory to read into the local processor memory the required elements of the vectors VM(I) and VA(I), and perform 1-iteration of SSDL-method in parallel for each sub-network to calculate node-voltage-magnitudes and node-voltage-angles.
46. As soon as 1-iteration is performed for a sub-network, its new local solution corrections estimate are contributed to the vectors DVM (I) and DVA(I) in commonly shared memory under the control of server processor without any need for the synchronization. It is possible that small sub-network finished 1-iteration and already contributed to the vectors DVM (I) and DVA(I) while 1-iteration is still being performed for the larger sub-network.
47. Contribution from a sub-network to the vectors DVM (I) and DVA(I) means, the complex voltage estimate calculated for the nodes of the sub-network are added to the corresponding elements of the vectors DVM (I) and DVA (I). After all sub-networks finished 1-iteration and contributed to the vectors DVM (I) and DVA(I), its each element is divided by the number of contributions from all sub-networks to each element or divided by number of nodes directly connected to the node represented by the vector element, leading to the transformation of vectors DVM (I) and DVA(I) into the new network-wide global solution correction estimates. This operation is performed as indicated in relation (31) and (32) or (38) and (39). This step requires synchronization in that the division operation on each element of the vectors DVM (I) and DVA(I) can be performed only after all sub-networks are solved and made their contribution to the vectors DVM (I) and DVA(I).
48. Update solution estimates VM(I) and VA(I), and proceed to step-43
49. From calculated values of complex voltage at different power network nodes, and tap position of tap changing transformers, calculate power flows through power network components, and reactive power generation at PV-nodes.

It can be seen that steps-42, -44, and -45 are performed in parallel. While other steps ate performed by the server-processor. However, with the refined programming, it is possible to delegate some of the server-processor tasks to the parallel-processors. For example, any assignment functions such as in step-43 can be performed in parallel. Even reading of system data can be performed in parallel particularly in distributed computing environment where each sub-network data can be read in parallel by substation computers connected to operate in parallel.

General Statements

The system stores a representation of the reactive capability characteristic of each machine and these characteristics act as constraints on the reactive power, which can be calculated for each machine.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respect as illustrative and not restrictive, the scope of the invention being indicated by the appended claims in addition to the foregoing description, and all changes which come within the meaning and range of equivalency of the claims are therefore intended to be embraced therein.

REFERENCES

Foreign Patent Document
1. U.S. Pat. No. 4,868,410 dated Sep. 19, 1989: "System of Load Flow Calculation for Electric Power System"
2. U.S. Pat. No. 5,081,591 dated Jan. 14, 1992: "Optimizing Reactive Power Distribution in an Industrial Power Network"

Published Pending Patent Applications
3. Canadian Patent Application Number: CA2107388 dated 9 Nov., 1993: "System of Fast Super Decoupled Loadflow Calcutation for Electrical Power System"
4. International Patent Application Number: PCT/CA/2003/001312 dated 29 Aug., 2003: "System of Super Super Decoupled Loadflow Computation for Electrical Power System"

Other Publications
5. Stagg G. W. and El-Abiad A. H., "Computer methods in Power System Analysis", McGrow-Hill, New York, 1968

6. S. B. Patel, "Fast Super Decoupled Loadflow", IEE proceedings Part-C, Vol. 139, No. 1, pp. 13-20, January 1992
7. Shin-Der Chen, Jiann-Fuh Chen, "Fast loadflow using multiprocessors", Electrical Power & Energy Systems, 22 (2000) 231-236

The embodiments of the invention in which an exclusive property or privilege is claimed are defined as follows:

1. A method of forming/defining and solving a model of a power network to affect control of voltages and power flows in a power system, comprising the steps of:

obtaining on-line/simulated data of open/close status of switches and circuit breakers in the power network, and reading data of operating limits of components of the power network including PV-node, a generator-node where Real-Power-P and Voltage-Magnitude-V are given/assigned/specified/set, maximum and minimum reactive power generation capability limits of generators, and transformers tap position limits, obtaining on-line readings of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, initiating loadflow computation with initial approximate/guess solution of the same voltage magnitude and angle as those of the reference/slack node for all the PQ-nodes and the PV-nodes, said initial approximate/guess solution is referred to as a slack-start, performing loadflow computation to calculate complex voltages or their real and imaginary components or voltage magnitude corrections and voltage angle corrections at nodes of the power network providing for calculation of power flow through different components of the power network, and to calculate reactive power generation and transformer tap-position indications, decomposing the power network for performing said loadflow computation in parallel by a method referred to as Suresh's diakoptics that involves determining a sub-network for each node involving directly connected nodes referred to as level-1 nodes and directly connected nodes to level-1 nodes referred to as level-2 nodes, and a level of outward connectivity for local solution of a sub-power-network around a given node is determined experimentally, initializing, at the beginning of each new iteration, a vector of dimension equal to the number of nodes in the power network with each element value zero, solving all sub-networks in parallel using available solution estimate at the start of the iteration, adding newly calculated solution estimates or corrections to the available solution estimate for a node resulting from different sub-networks, 'q' number of sub-networks, in which a node is contained, in a corresponding vector element that gets initialized zero at the beginning of each new iteration, counting the number of additions and calculating new solution estimate or corrections to the available solution estimate by taking the average or root mean square value using any relevant relations (30) to (39) in the following depending on the loadflow computation method used, and storing the new solution estimate at the end of the current iteration as initial available estimate for the next iteration, wherein said Suresh's diakoptics method uses the following relations, $$V_p^{(r+1)} = (V_{p1}^{(r+1)} + V_{p2}^{(r+1)} + V_{p3}^{(r+1)} + \ldots + V_{pq}^{(r+1)})/q \quad (30)$$

$$\Delta\theta_p^{(r+1)} = (\Delta\theta_{p1}^{(r+1)} + \Delta\theta_{p2}^{(r+1)} + \Delta\theta_{p3}^{(r+1)} + \ldots + \Delta\theta_{pq}^{(r+1)})/q \quad (31)$$

$$\Delta V_p^{(r+1)} = (\Delta V_{p1}^{(r+1)} + \Delta V_{p2}^{(r+1)} + \Delta V_{p3}^{(r+1)} + \ldots + \Delta V_{pq}^{(r+1)})/q \quad (32)$$

$$e_p^{(r+1)} = (e_{p1}^{(r+1)} + e_{p2}^{(r+1)} + e_{p3}^{(r+1)} + \ldots + e_{pq}^{(r+1)})/q \quad (33)$$

$$f_p^{(r+1)} = (f_{p1}^{(r+1)} + f_{p2}^{(r+1)} + f_{p3}^{(r+1)} + \ldots + f_{pq}^{(r+1)})/q \quad (34)$$

wherein relations (30) to (34), can also alternatively be written as relations (35) to (39) as below, $$V_p^{(r+1)} = \sqrt{\left(Re\left((V_{p1}^{(r+1)2})\right) + Re\left((V_{p2}^{(r+1)})^2\right) + \ldots + Re\left((V_{pq}^{(r+1)})^2\right)\right)/q} + j\sqrt{\left(Im\left((V_{p1}^{(r+1)})^2\right) + Im\left((V_{p2}^{(r+1)})^2\right) + \ldots + Im\left((V_{pq}^{(r+1)})^2\right)\right)/q} \quad (35)$$

$$\Delta\theta_p^{(r+1)} = \sqrt{\left((\Delta\theta_{p1}^{(r+1)})^2 + (\Delta\theta_{p2}^{(r+1)})^2 + \ldots + (\Delta\theta_{pq}^{(r+1)})^2\right)/q} \quad (36)$$

$$\Delta V_p^{(r+1)} = \sqrt{\left((\Delta V_{p1}^{(r+1)})^2 + (\Delta V_{p2}^{(r+1)})^2 + \ldots + (\Delta V_{pq}^{(r+1)})^2\right)/q} \quad (37)$$

$$e_p^{(r+1)} = \sqrt{\left((e_{p1}^{(r+1)})^2 + (e_{p2}^{(r+1)})^2 + \ldots + (e_{pq}^{(r+1)})^2\right)/q} \quad (38)$$

$$f_p^{(r+1)} = \sqrt{\left((f_{p1}^{(r+1)})^2 + (f_{p2}^{(r+1)})^2 + \ldots + (f_{pq}^{(r+1)})^2\right)/q} \quad (39)$$

wherein, square of any positive or negative number being positive, if the original not-squared value of any number is negative, the same algebraic sign is attached after squaring that number, and if the mean of squared values turns out to be a negative number, negative sign is attached after taking the square root of the unsigned number, $V_p$, $\theta_p$ are voltage magnitude and voltage angle at node-p, $e_p$ and $f_p$ are the real and imaginary parts of the complex voltage $V_p$ of node-p, symbol $\Delta$ before any of defined electrical quantities defines the change in the value of electrical quantity, and superscript 'r' indicates the iteration count, evaluating loadflow computation for any over loaded components of the power network and for under/over voltage at any of the nodes of the power network, correcting one or more controlled parameters and repeating the performing loadflow computation by decomposing, initializing, solving, adding, counting, storing, evaluating, and correcting steps until evaluating step finds no over loaded components and no under/over voltages in the power network, and affecting a change in power flow through components of the power network and voltage magnitudes and angles at the nodes of the power network by actually implementing the finally obtained values of controlled variables/parameters after evaluating step finds a good power system or alternatively the power network without any overloaded components and under/over voltages, which finally obtained controlled variables/parameters however are stored for acting upon fast in case a simulated event actually occurs.

2. A method as defined in claim 1 wherein the loadflow computation method referred to as Gauss-Seidel-Patel Loadflow (GSPL) computation method is characterized in using self-iteration denoted by 'sr' within a network-wide/sub-network-wide global iteration depicted by 'r' in the GSPL model defined by equation (27) given in the following, $$(V_p^{(sr+1)})^{(r+1)} = \left[ \{(PSH_p - jQSH_p)/((V_p^*)^{sr})^r\} - \sum_{q=1}^{p-1} Y_{pq} V_q^{(r+1)} - \sum_{q=p+1}^{n} Y_{pq} V_q^r \right] / Y_{pp} \quad (27)$$

wherein, $PSH_p$ and $QSH_p$ are scheduled/specified/known/set real and reactive power, $V_p$ is the complex node-p voltage, and $Y_{pq}$ and $Y_{pp}$ are off-diagonal and diagonal complex elements of the network admittance matrix.

3. A method as defined in claim 1 wherein a parallel loadflow computation is performed using a parallel computer: a server processor-array processors architecture, wherein each of the array processors send communication to and receive communication from only the server processor, commonly shared memory locations, and each processor's private memory locations, but not among themselves.

4. A multiprocessor computing apparatus for performing the said parallel loadflow computation as defined in claim 1 comprising in combination:
   a plurality of processing units adapted to receive and process data, instructions and control signals, and connected to common system bus in parallel asynchronous fashion;
   a plurality of local private main memory means for storing the data, instructions and control signals, each said main memory means being directly and asynchronously connected to each said processing unit;
   common shared memory coupled directly to said common system bus for sending/receiving the data, instructions and control signals asynchronously to/from each said processing unit, without providing inter-processor communications;
   I/O adapter/control unit coupled directly and asynchronously to a main/server processor, which is one of the said plurality of processing units;
   wherein said I/O adapter/control unit coupled directly and asynchronously to each of said plurality of processing units physically located at far distances in case of said multiprocessor computing apparatus organized for distributed processing.

* * * * *